United States Patent
Keeton et al.

(10) Patent No.: US 7,536,585 B1
(45) Date of Patent: *May 19, 2009

(54) METHOD OF ESTIMATING STORAGE SYSTEM AVAILABILITY

(75) Inventors: Kimberly Keeton, San Francisco, CA (US); Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 608 days.

This patent is subject to a terminal disclaimer.

(21) Appl. No.: 11/166,670

(22) Filed: Jun. 23, 2005

(51) Int. Cl.
*G06F 11/00* (2006.01)

(52) U.S. Cl. .................. 714/6; 714/5; 714/33; 714/42; 714/47

(58) Field of Classification Search .............. 714/5, 714/33, 42, 47
See application file for complete search history.

(56) References Cited

U.S. PATENT DOCUMENTS

| | | | |
|---|---|---|---|
| 5,742,792 | A | 4/1998 | Yanai et al. |
| 6,076,143 | A | 6/2000 | Blumenau |
| 6,173,377 | B1 | 1/2001 | Yanai et al. |
| 6,182,198 | B1 | 1/2001 | Hubis et al. |
| 6,321,317 | B1 | 11/2001 | Borowsky et al. |
| 6,366,931 | B1 | 4/2002 | Borowsky et al. |
| 6,526,420 | B2 | 2/2003 | Borowsky et al. |
| 6,594,744 | B1 | 7/2003 | Humlicek et al. |
| 6,609,183 | B2 | 8/2003 | Ohran |
| 6,718,447 | B2 | 4/2004 | Cochran |
| 6,813,686 | B1 | 11/2004 | Black |
| 7,197,615 | B2 * | 3/2007 | Arakawa et al. ............ 711/162 |
| 2005/0066239 | A1 | 3/2005 | Keeton et al. |
| 2005/0102547 | A1 | 5/2005 | Keeton et al. |

OTHER PUBLICATIONS

Guillermo A. Alvarez et al., Minerva: an automated resource provisioning tool for large-scale storage systems, 2001, HP Labs, Palo Alto, CA.

E. Anderson et al., Ergastulum: quickly finding near-optimal storage system designs, 2001, HP Labs, Palo Alto, CA.

Eric Anderson et al., Hippodrome: running circles around storage administration, Conference on File and Storage Technologies (FAST'02), 2002, pp. 175-188, The USENIX Association, Berkeley, CA.

Disaster Tolerance—The Technology of Business Continuity, 2000, The Applied Technologies Group, Inc., Natick, MA.

Algirdas A Vižienis et al., Fundamental Concepts of Dependability, 2000, Los Angeles, CA.

Alain Azagury et al., Point-in-Time Copy: Yesterday, Today and Tomorrow. 10th Goddard Conference on Mass Storage Systems and Technologies, 19th IEEE Symposium on Mass Storage Systems, pp. 259-270, Apr. 2002, IEEE, New York, NY.

(Continued)

*Primary Examiner*—Robert Beausoliel
*Assistant Examiner*—Charles Ehne

(57) ABSTRACT

An embodiment of a method of estimating storage system availability begins with a first step of modeling a storage system design in operation under a workload to determine location of retrieval points. The retrieval points provide sources for primary storage recovery for a plurality of failure scenarios. For a particular failure scenario, the method continues with a second step of finding a secondary storage location of a most recent retrieval point relative to a target recovery time that is available for recovery. A third step determines a recovery time for propagation of the most recent retrieval point from the secondary storage location to primary storage.

36 Claims, 12 Drawing Sheets

OTHER PUBLICATIONS

Charlotte Brooks et al., Disaster Recovery Strategies with Tivoli Storage Management, 2nd Edition, 2002, International Business Machines Corporation, White Plains, NY. <http://www.redbooks.ibm.com/redbooks/pdfs/sg246844.pdf>.

Aaron Brown et al., Towards Availability Benchmarks: A Case Study of Software RAID Systems, Proceedings of 2000 USENIX Annual Technical Conference, 2000, The USENIX Association, Berkeley, CA.

Ann L. Chervenak et al., Protecting File Systems: A Survey of Backup Techniques, Sixth NASA Goddard Space Flight Center Conference on Mass Storage Systems and Technologies, Fifteenth IEEE Symposium on Mass Storage Systems, 1998, pp. 17-31, IEEE, New York, NY.

Classes of Recovery, 2003, CNT, Minneapolis, MN.

James Da Silva et al., The Amanda Network Backup Manager, Seventh System Administration Conference, 1993, pp. 171-182, The USENIX Association, Berkeley, CA.

Online Survey Results, 2001 Cost of Downtime, 2001, Eagle Rock Alliance, Ltd., West Orange, NJ.

EMC TimeFinder Product Description Guide, 1998, EMC Corporation, Hopkinton, MA. <http://www.emc.com/products/product_pdfs/pdg/timefinder_pdg.pdf>.

EMC Networked Storage ROI & TCO Calculator, Jun. 15, 2005, EMC Corporation, Hopkinton, MA. <http://www.emc.com/forms/commercial/roi_calculator/project.jsp>.

Garth A. Gibson et al., Designing Disk Arrays for High Data Reliability, 1993, Pittsburgh, PA.

high availability—keeping your IT resources available, 2002, Hewlett-Packard, Palo Alto, CA. <http://h50043.www5.hp.com/hpservices/pdfs/high_availability.pdf>.

HP Enterprise Tape Library Architecture, Jun. 15, 2005, Hewlett-Packard Development Company, L. P., Palo Alto, CA. <http://h18006.www1.hp.com/products/storageworks/tlarchitecture/>.

HP StorageWorks Enterprise Virtual Array 5000, Jun. 15, 2005, Hewlett-Packard Development Company, L.P., Palo Alto, CA. <http://h18006.www1.hp.com/products/storageworks/enterprise/>.

HP StorageWorks Sizer, Jun. 15, 2005, Hewlett-Packard Development Company, L.P., Palo Alto, CA. <http://h30144.www3.hp.com/>.

Dave Hitz et al., File System Design for an NFS File Server Appliance. USENIX Winter 1994 Technical Conference Proceedings, 1994, pp. 235-246, The USENIX Association, Berkeley, CA.

Minwen Ji et al., Seneca: remote mirroring done write, Proceedings of USENIX Technical Conference, pp. 253-268, Jun. 2003, The USENIX Association, Berkeley, CA.

Kimberly Keeton et al., Automating data dependability, 2002, HP Labs, Palo Alto, CA.

Kimberly Keeton et al., Automatic design of dependable data storage systems, May 30, 2003, HP Labs, Palo Alto, CA.

Kimberly Keeton et al., Designing for disasters, Proceedings of the Third USENIX Conference on File and Storage Technologies, Mar. 31, 2004, The USENIX Association, Berkeley, CA.

Kimberly Keeton et al., A Framework for Evaluating Storage System Dependability, Jun. 28, 2004, Palo Alto, CA.

John Kubiatowicz et al., OceanStore: An Architecture for Global-Scale Persistent Storage, Proceedings of the Ninth International Conference on Architectural Support for Programming Languages and Operating Systems, 2000, pp. 190-201. ACM Press New York NY.

Anand Kuratti et al., Performance analysis of the RAID 5 disk array, IEEE International Computer Performance and Dependability Symposium (IPDS '95), 1995, pp. 236-245. IEEE, New York NY.

Manish Malhotra et al.,. Data integrity analysis of disk array systems with analytic modeling of coverage. Performance Evaluation, 1995, 22(1):111-133, Elsevier Science Publishers B. V. Amsterdam, The Netherlands.

Arif Merchant et al., An analytical model of reconsruction time in mirrored disks. Performance Evaluation, 1994, 20(1-3):115-129, Elsevier Science Publishers B. V. Amsterdam, The Netherlands.

Richard R. Muntz et al., Performance Analysis of Disk Arrays Under Failure,. 16th International Conference on Very Large Data Bases, 1990, pp. 162-173, Morgan Kaufmann Publishers, San Francisco, CA.

David A. Patterson et al., A Case for Redundant Arrays of Inexpensive Disks (RAID), Proceedings of the 1988 ACM SIGMOD international conference on Management of data, 1988, pp. 109-116, ACM Press, New York, NY.

Hugo Patterson et al. SnapMirror®: File System Based Asynchronous Mirroring for Disaster Recovery, Proceedings of the FAST 2002 Conference on File and Storage Technologies, 2002, pp. 117-129, The USENIX Association, Berkeley, CA.

Stefan Savage et al., AFRAID—A Frequently Redundant Array of Independent Disks, Proceedings of the USENIX 1996 Annual Technical Conference, 1996, pp. 27-39, The USENIX Association, Berkeley, CA.

Daniel P. Siewiorek et al., Reliable Computer Systems: Design and Evaluation, Third Edition, 1998, A K Peters, Ltd., Natick, MA.

Tape Library Calculator, Version 2.7, Jun. 15, 2005, Sun Microsystems, Inc., Santa Clara, CA. <http://www.sun.com/storage/tape/tape_lib_calculator.html>.

Dong Tang et al., Automatic Generation of Availability Models in RAScad, Proceedings of the International Conference on Dependable Systems and Networks (DSN'02), 2002, IEEE Computer Society, Los Alamitos, CA.

John Wilkes et al., Specifying data availability in mult-device file systems, Technical Report HPL-CSP-90-6, 1990, HP Labs, Palo Alto, CA.

John Wilkes, Traveling to Rome: QoS specifications for automated storage system management, Proceedings of the International Workshop on Quality of Service (IWQoS), 2001 Springer-Verlag, Berlin, Germany.

Jay J. Wylie et al., Selecting the Right Data Distribution Scheme for a Survivable Storage System, Report CMU-CS-01-120, May 2001, Carnegie Mellon University, Pittsburgh, PA.

Inventor: Kimberly K. Keeton et al., U.S. Appl. No. 10/944,321, filed Sep. 17, 2004.

Inventor: Kimberly K. Keeton et al., U.S. Appl. No. 11/166,671, filed Jun. 23, 2005.

Inventor: Kimberly K. Keeton et al., U.S. Appl. No. 11/166,851, filed Jun. 23, 2005.

Inventor: Kimberly K. Keeton et al., U.S. Appl. No. 11/166,852, filed Jun. 23, 2005.

Inventor: Kimberly K. Keeton et al., U.S. Appl. No. 10/943,732, filed Sep. 17, 2004.

* cited by examiner

Table 1

Data protection technique parameters

| Parameter | Notation | Units | Description |
|---|---|---|---|
| Accumulation window | *accW* | sec | Period over which updates are batched to create a retrieval point (RP) |
| Propagation window | *propW* | sec | Time to transmit RP between nodes |
| Hold window | *holdW* | sec | Delay between receiving and transmitting an RP |
| Cycle count | *cycleCnt* | | Count number of secondary windows between primary windows |
| Cycle period | *cyclePer* | sec | Length of a cycle for a policy with multiple accumulation windows |
| Retention count | *retCnt* | count | Number of cycles of RPs simultaneously retained |
| Retention window | *retW* | sec | Time period for retaining a particular RP |
| Copy representation | *copyRep* | | RP representation that is maintained |
| Propagation representation | *propRep* | | RP representation that is propagated |

FIG. 2

Table 2

| Hardware device configuration parameters | | | |
|---|---|---|---|
| Parameter | Notation | Units | Description |
| maximum capacity slots | *maxCapSlots* | count | max. no. of slots for capacity devices (tapes, disks) |
| max. bandwidth slots | *maxBWSlots* | count | max. no. of slots for bandwidth devices (tape drives, disks) |
| slot capacity | *slotCap* | bytes per-slot | (tape cartridge or disk) capacity |
| slot bandwidth | *slotBW* | bytes/sec | per-slot (tape drive or disk) bandwidth |
| enclosure bandwidth | *enclBW* | bytes/sec | aggregate enclosure bandwidth (including busses and controllers) |
| delay | *devDelay* | sec | delay for accessing storage device or delay for interconnect propagation |
| fixed costs | *fixCost* | US dollars | fixed costs for enclosure, facilities, service |
| capacity-dependent costs | *capCost* | US dollars/byte | per-capacity costs for device, facilities, service |
| bwdth-dependent costs | *bwCost* | US dollars/byte/sec | per-bandwidth costs for device, facilities, service |
| spare type | *spareType* | | spare resources available for device |
| spare provisioning time | *spareTime* | sec | time to provision spare resources |
| spare discount factor | *spareDisc* | multiplier | fraction of original dedicated resource cost for shared spare |

FIG. 5

| Table 6 | | | |
|---|---|---|---|
| Worst Case Recovery Time and Data Loss Time Period | | | |
| Failure Scope | Recovery Source | Recovery Time | Data Loss Time Period |
| Data object | Split mirror | 0.004 s | 12 hr |
| Disk array | Tape backup | 2.4 hr | 217 hr |
| Site | Remote vault | 26.4 hr | 1429 hr |

Table 3

| | Workload | | |
|---|---|---|---|
| *dataCap* | *avgAccessR* | *avgUpdateR* | *burstM* | *batchUpdR(win)* |
| 1360 GB | 1028 KB/s | 799 KB/s | 10X | 1 min: 727 KB/s; 12 hr: 350 KB/s; 24 hr, 48 hr, 1 wk: 317 KB/s |

FIG. 11

Table 4

| Data Protection Technique Parameters | | | | | | | | | |
|---|---|---|---|---|---|---|---|---|---|
| Technique | *accW* | *propW* | *holdW* | *cyclePer* | *retCnt* | *retW* | *copyRep* | *propRep* |
| Split mirror | 12 hr | 0 hr | 0 hr | 12 hr | 4 | 2 days | full | full |
| Tape backup | 1 wk | 48 hr | 1 hr | 1 wk | 4 | 4 wks | full | full |
| Remote vault | 4 wk | 24 hr | 4 wk + 12 hr | 4 wk | 39 | 3 yrs | full | full |

FIG. 12

Table 5
Device Configuration Parameters
| Device | maxCapSlots @slotCap (GB) | maxBWSlots @slotBW (GB) | enclBW (MB/s) | devDelay (hr) | Costs ($) | spareType | spareTime (hr) | spareDisc |
|---|---|---|---|---|---|---|---|---|
| Disk Array | 256@73GB | 256@25MB/s | 512MB/s | n/a | $123297 + c*17.2$ | Dedicated | 0.02 | 1 |
| Tape Lib | 500@400GB | 16@60MB/s | 240MB/s | 0.01hr | $98895 + c*0.4 + b*108.6$ | Dedicated | 0.02 | 1 |
| Remote Vlt | 5000@400GB | n/a | n/a | n/a | $25000 + c*0.4$ | None | n/a | n/a |
| Air shpmnt | n/a | n/a | n/a | 24hr | $s*50$ | None | n/a | n/a |
FIG. 13
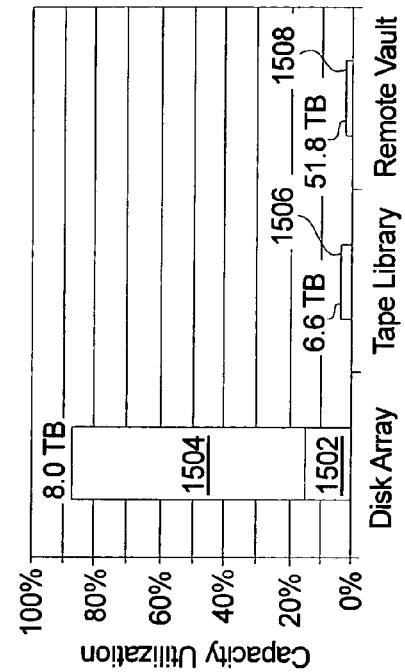
FIG. 15
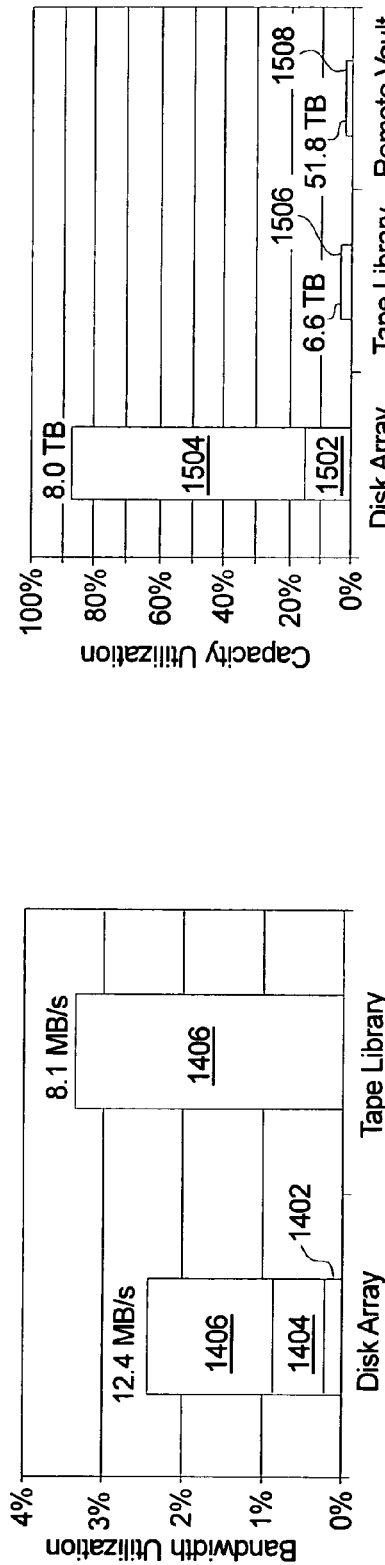
FIG. 14

Table 7

Baseline Storage System Design and Alternatives

| Storage System Design | Outlays | Array Failure | | | | Site Failure | | | |
|---|---|---|---|---|---|---|---|---|---|
| | | RT (hr) | DLTP (hr) | Penalties | Tot Cost | RT (hr) | DLTP (hr) | Penalties | Tot Cost |
| Baseline | $0.97M | 2.4 | 217 | $10.9M | $11.94M | 26.4 | 1429 | $70.97M | $71.94M |
| Weekly Vault | $0.99M | 2.4 | 217 | $10.9M | $11.96M | 26.4 | 253 | $13.97M | $14.96M |
| Weekly Vault, Full & Incr. Backups | $0.99M | 4.0 | 73 | $3.85M | $4.84M | 26.4 | 253 | $13.97M | $14.96M |
| Weekly Vault, Daily Full Backups | $1.01M | 2.4 | 37 | $1.97M | $2.98M | 26.4 | 217 | $12.17M | $13.18M |
| Weekly Vault, Daily Full Backups, Snapshots | $0.76M | 2.4 | 37 | $1.97M | $2.73M | 26.4 | 217 | $12.17M | $12.93M |
| AsyncB Mirror, 1 Link | $0.93M | 21.7 | 0.03 | $1.09M | $2.01M | 21.7 | 0.03 | $1.09M | $2.01M |
| AsyncB Mirror, 10 Links | $5.03M | 2.8 | 0.03 | $0.14M | $5.18M | 9.8 | 0.03 | $0.49M | $5.52M |

FIG. 18

METHOD OF ESTIMATING STORAGE SYSTEM AVAILABILITY

RELATED APPLICATIONS

This application is related to U.S. application Ser. Nos. 11/166,851 (now U.S. Pat. No. 7,467,329), 11/166,852, and 11/166,671, filed on Jun. 23, 2005, the contents of which are hereby incorporated by reference.

FIELD OF THE INVENTION

The present invention relates to the field of computer storage systems. More particularly, the present invention relates to the field of computer storage systems where there is a need for an estimate of storage system availability.

BACKGROUND OF THE INVENTION

Data is the primary asset of most corporations in the information age, and businesses must be able to access that data to continue operation. In a 2001 survey, a quarter of the respondents estimated their outage costs as more than $250,000 per hour, and 8% estimated them as more than $1M per hour. The price of data loss is even higher. It has been estimated that two out of five enterprises that experience a site disaster go out of business within five years. Dependable data storage systems are needed to avoid such problems.

Fortunately, many techniques exist for protecting data, including tape backup, mirroring and parity-based RAID schemes for disk arrays, wide area inter-array mirroring, snapshots, and wide area erasure-coding schemes. New techniques continue to be invented and older techniques become more widely used as the cost of storage capacity drops. Each technique protects against a subset of the possible failure scenarios and techniques are often used in combination to provide greater coverage.

Disk arrays are typically used to store a primary copy of data. Disk arrays often employ internal protection against hardware failure through RAID techniques and redundant hardware paths to the data. Other failures, such as user errors, software errors, or hardware failures employ techniques that periodically make secondary copies of the data. The secondary copies preferably reflect a consistent version of the primary copy at some instant in time. The main classes of such techniques are mirroring, point-in-time copies, and backup.

Inter-array mirroring keeps a separate, isolated copy of the current data on another disk array, which may be co-located with the primary array or remote. Inter-array mirrors may be synchronous, where each update to the primary is also applied to the secondary before write completion, or asynchronous, where updates are propagated in the background. Batched asynchronous mirrors coalesce overwrites and send batches to the secondary to be applied atomically (i.e., once a write of a batch begins, it completes without interruption). Batched asynchronous mirrors lower the peak bandwidth needed between the copies by reducing the number of updates propagated and smoothing out update bursts.

A point-in-time (PiT) image is a consistent version of the data at a single point in time, typically on the same array. The PiT image may be formed as a split mirror, where a normal mirror is maintained until the "split" operation, which stops further updates to the mirror, or as a virtual snapshot, where a virtual copy is maintained using copy-on-write techniques, with unmodified data sharing the same physical storage as the primary copy. Most enterprise-class disk arrays provide support for one or more of these techniques.

Backup is the process of making secondary copies on separate hardware, which could be another disk array, a tape library or an optical storage device. Backups may be full backups; cumulative incremental backups, where all changes since the last full backup are copied; or differential incremental backups, where only the portions changed since the last full or cumulative incremental are copied. Tape backup is typically done using some combination of these alternatives (e.g., weekend full backups, followed by a cumulative incremental every weekday). Backups made to physically removable media, such as tape or optical disks, may also be periodically moved to an off-site vault for archival storage.

Backup techniques and tools have been studied from an operational perspective. There are also a number of studies describing alternative mechanisms for archival and backup and file systems that incorporate snapshots. Evaluations of the dependability of storage systems have focused mainly on disk arrays.

Unfortunately, the multitude of data protection techniques combined with their configuration parameters often means that it is difficult to employ each technique appropriately. System administrators often use ad hoc techniques for designing their data storage systems, focusing more on setting configuration parameters (e.g., backup windows), rather than on trying to achieve a particular dependability. As a result, it is often unclear what dependability a given storage system design provides, whether the business' dependability goals have been met, or whether the system costs too much.

SUMMARY OF THE INVENTION

The present invention comprises a method of estimating storage system availability. According to an embodiment, the method begins with a first step of modeling a storage system design in operation under a workload to determine location of retrieval points. The retrieval points provide sources for primary storage recovery for a plurality of failure scenarios. For a particular failure scenario, the method continues with a second step of finding a secondary storage location of a most recent retrieval point relative to a target recovery time that is available for recovery. A third step determines a recovery time for propagation of the most recent retrieval point from the secondary storage location to primary storage.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 2 is a table of data protection technique parameters in accordance with embodiments of the present invention;

FIG. 5 is a table of hardware device configuration parameters in accordance with embodiments of the present invention;

FIG. 11 is a table of workload parameters in accordance with exemplary embodiments of the present invention;

FIG. 12 is a table of data protection techniques for secondary storage nodes in accordance with exemplary embodiments of the present invention;

FIG. 13 is a table of device configuration parameters and cost models in accordance with exemplary embodiments of the present invention;

FIG. 14 is a graph depicting bandwidth demands in accordance with an exemplary embodiment of the present invention;

FIG. 15 is a graph depicting capacity demands in accordance with an exemplary embodiment of the present invention;

FIG. 18 is a table of alternatives to a baseline storage system design in accordance with exemplary embodiments of the present invention.

DETAILED DESCRIPTION OF A PREFERRED EMBODIMENT

Figure 1:
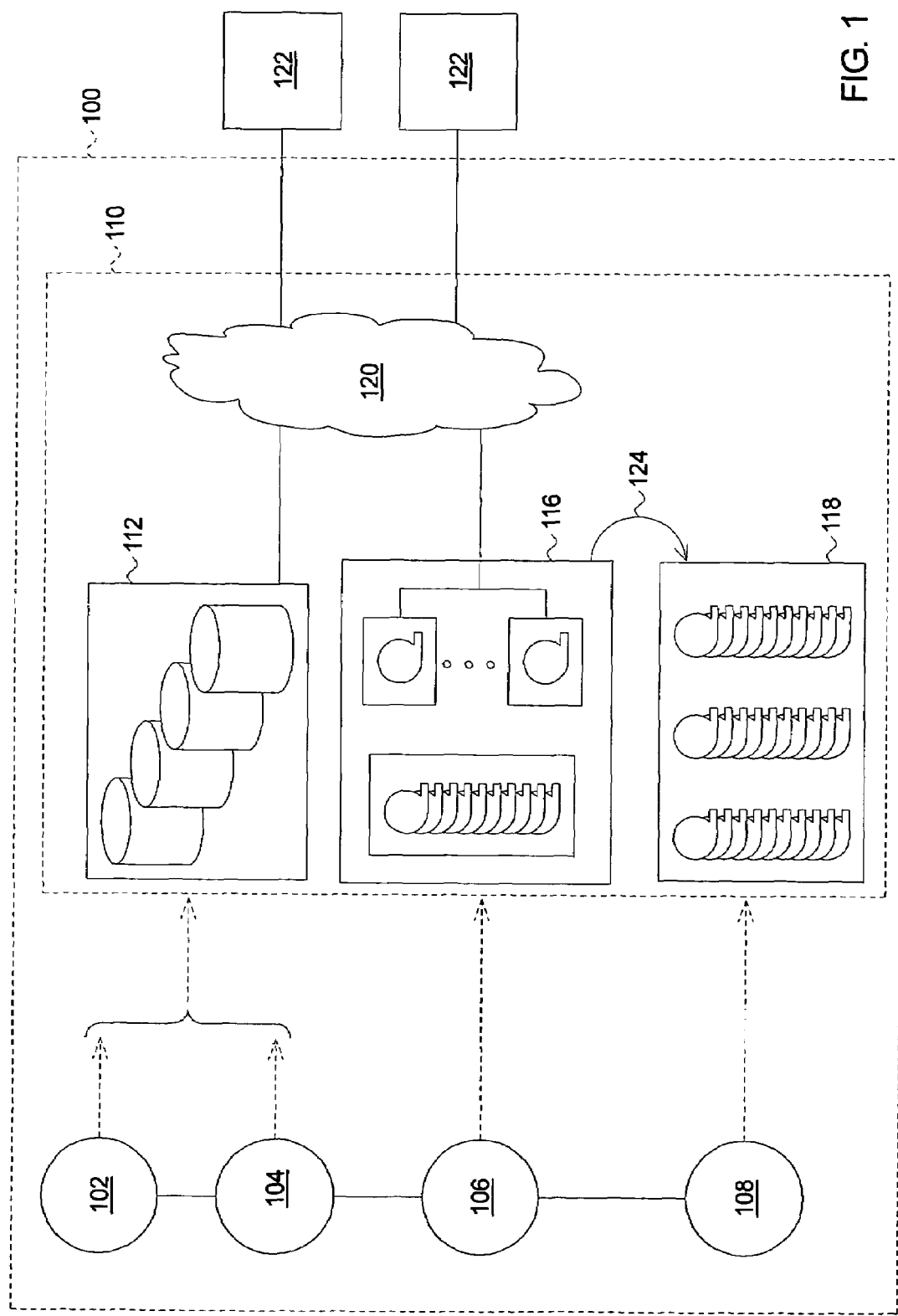
FIG. 1 illustrates an exemplary storage system design in accordance with embodiments of the present invention.

In an embodiment, the present invention is a computer-implemented method of estimating storage system utilization. In another embodiment, the present invention is a computer-implemented method of estimating storage system availability. In another embodiment, the present invention is a computer-implemented method of estimating storage system reliability. In yet another embodiment, the present invention is a computer-implemented method of estimating storage system cost. A computer readable medium can have computer code stored thereon which when executed implements the methods described herein.

Embodiments of the methods of the present invention may provide a framework for quantitatively evaluating the dependability of storage system designs. For example, the framework (i.e., embodiments of the present invention) may be used as part of computer aided design tool for designing dependable storage systems. The framework may include estimates for storage system utilization, storage system reliability, storage system availability, and storage system cost.

The estimate for storage system utilization may provide component and system utilization under normal operation. The estimates for storage system reliability and availability provide measures of storage system dependability. The term "dependability" means both availability and reliability. Availability may be estimated as a recovery time, which is the time period between a failure and resumption of normal operation. A recovery time objective provides an acceptable upper bound for the recovery time. When a failure occurs, it may be necessary to revert back to a consistent point prior to the failure, which entails loss of data. Reliability may be estimated as a data loss time period, which is the time period between when a point-in-time copy was made and the time of the failure. A recovery point objective provides an upper bound for the data loss time period. Both the recovery time objective and the recovery point objective may range from zero to days or longer. The recovery time and data loss time period may be evaluated under a specified failure scenario. Or, the recovery time and data loss time period may be evaluated for the effects of different failures weighted by their frequency of occurrence (i.e., probability of occurrence). The estimate for system cost may include capital and service cost outlays as well as penalties for violating the recovery time objective and the recovery point objective for a particular failure scenario or for a plurality of failure scenarios weighted by their frequency.

The following description is divided into six sections: Modeling storage system design, estimating storage system utilization, estimating storage system reliability, estimating storage system availability, estimating storage system cost, and exemplary embodiments.

1. Modeling Storage System Design

Embodiments of the methods of estimating storage system utilization, availability, reliability, and cost employ a step of modeling a storage system design in operation under a workload. In an embodiment of the method of estimating storage system utilization, the step of modeling the storage system design determines bandwidth demands and capacity demands for propagation and retention of retrieval points. In embodiments of the methods of estimating storage system reliability, availability, and cost, the step of modeling the storage system design determines location of retrieval points. Retrieval points provide sources for primary storage recovery for a plurality of failure scenarios.

The workload may be characterized as a workload capacity demand, which is an amount of primary data that is propagated and retained in the storage system design. The workload capacity demand may correspond to the demand of a single data object stored in a primary storage. Alternatively, the workload capacity may be multiple data objects stored in the primary storage. The workload may be further characterized by one or more additional workload parameters such as an average update rate, an average access rate, a ratio of peak update rate to the average update rate (i.e., burstiness), or a batch update rate (e.g., rate for updates to unique locations during a batch time window).

Failure scenarios may arise from hardware failures, software failures, or user errors. Failure scenarios may be characterized by a failure scope, which is the set of storage and interconnection devices failed, and a recovery time target, which is a point-in-time to which restoration of data is desired. The failure scope indicates extents of a failure. For example, the failure scope may be indicated as a data object (e.g., primary data stored in a disk array), a disk array, a building, a site, or a geographic region. A particular failure cause may lead to a particular recovery time target. Under many circumstances, the recovery target time is the time of a hardware failure. For example, upon failure of a primary disk array the recovery time may be as close to the present time as possible. In cases of a data deletion or corruption, the recovery time target may be just before the error occurred and could be significantly in the past.

The storage system design comprises a primary storage node and a plurality of secondary storage nodes. The primary storage node holds primary data and its capacity exceeds the workload capacity demand. The primary storage node employs a primary storage technique (e.g., a RAID technique). Each of the secondary storage nodes employs a data protection technique. The secondary storage nodes hold retrieval points, which are full or partial copies of the primary data taken at various times. Each retrieval point imposes the workload capacity demand (or a portion of it) upon the secondary storage node that holds it. The primary and secondary storage nodes operate on hardware devices. Some hardware devices may be shared among two or more of the primary and secondary storage nodes. For example, a primary storage node and a split mirror secondary storage node may share a disk array. Or, for example, a remote mirror secondary storage node, which mirrors a primary storage node, and a split mirror secondary storage node, which provides point-in-time copies of the remote mirror, may share a disk array. The primary and secondary storage nodes may be modeled as a hierarchy, where each level in the hierarchy corresponds to either the primary storage node or a secondary storage node. In a hierarchical model, the hierarchy defines a propagation path for retrieval points. Alternatively, the primary and secondary storage nodes may be modeled as a branched hierarchy (i.e., where the primary storage node or a secondary storage node acts as a source to two or more other nodes); or, the primary and secondary storage nodes may be modeled by a node dependency where each secondary storage node has an associated source node (i.e., another secondary storage node or the primary storage node).

Each secondary storage node retains a number of retrieval points. The primary storage node serves as a source for retrieval points for one or more secondary storage nodes. A secondary storage node may serve as a source for retrieval points for one or more other secondary storage nodes. For example, if the storage system design is modeled as a hierarchy, the primary storage node may be identified as level zero and may serve as the source for retrieval points for a level one secondary storage node. Similarly, the level one secondary storage node may serve as the source for retrieval points for a level two secondary storage node. As the level numbers increase, the data protection techniques typically store less frequent retrieval points, possess larger capacity for retaining more retrieval points, and exhibit longer recovery times.

An embodiment of an exemplary storage system design employed by embodiments of methods of the present invention is illustrated schematically in FIG. 1. The exemplary storage system design 100 includes a primary storage node 102 and first through third secondary storage nodes, 104 . . . 108. The primary storage node 102 serves as a source for first retrieval points for the first secondary storage node 104. The first retrieval points may be point-in-time copies of primary data held by the primary storage node. The first secondary storage node 104 serves as a source for second retrieval points for the second secondary storage node 106. The second retrieval points may be backups of the primary data. The second secondary storage node 106 serves as source for third retrieval points for the third secondary storage node 108. The third retrieval points may be backups of the primary data held in a remote vault.

In an embodiment, the hardware 110 employed by the primary storage node 102 and the first through third secondary storage nodes include a disk array 112, a tape library 116, and a remote vault 118. A SAN (storage area network) 120 couples the disk array 112, the tape library 116, and hosts 122. The hosts 122 access and update the primary secondary node 102, which is held by the disk array 112. The disk array 112 operates as a split mirror maintaining the primary data, a number of point-in-time copies of the primary data (i.e., the first retrieval points), and an intra-array mirror. At a point-in-time in the near future the intra-array mirror is "split" from the primary storage node to become a most recent of the first retrieval points. At this time, the oldest point-in copy (i.e., the oldest of the first retrieval points) is brought up-to-date (i.e., it is resilvered) and becomes the intra-array mirror. At some later time this mirror is split from the primary storage node to now become the most recent of the first retrieval points.

Occasionally, a point-in-time copy (i.e., one of the first retrieval points) acts as the source for a tape backup (i.e., one of the second retrieval points), which is transmitted to the tape library 116 via the SAN 120. The tape backup may be a full backup or an incremental backup and may be a backup within a cycle that includes a full backup and one or more incremental backups. Occasionally, a courier service 124 transports a tape backup (i.e., one of the second retrieval points) from the tape library 116 to the remote vault 118, transforming the tape backup to one of the third retrieval points.

The primary storage node 102 and the first through third secondary storage nodes, 104 . . . 108, form a hierarchical model where the propagation path of retrieval points proceeds from the primary storage 102 to the first secondary storage node 104, followed by the second secondary storage node 106, and finally the third secondary storage node 108.

A recovery path describes a route to the primary storage node 102 from a particular secondary storage node that holds the retrieval point that recovers the primary data of the primary storage node 102. By default, the recovery path may be merely the reverse of the propagation path. As an optimization, some secondary storage nodes may be skipped if they only contribute additional time to the recovery. For example, if the source of a recovery is the third secondary storage node 108 (i.e., the remote vault 118), the recovery path may be a courier from the remote vault 118 to the tape library 116 and then direct recovery of the primary storage node 102 skipping recovery of the point-in-time copies of the split mirror. Alternatively, tape devices at the remote vault 118 may read the tapes at the remote vault 118, and a network may transmit the data to the primary storage node 102, skipping both the tape library 116 (i.e., the second secondary storage node) and the point-in-time copies of the split mirror (i.e., the first secondary storage node).

It will be readily apparent to one skilled in the art that the exemplary storage system design 100 is one of numerous possible storage system designs that may be modeled according to the present invention. Further, it will be readily apparent to one skilled in the art that numerous data protection techniques beyond split mirror techniques, tape backup techniques, and remote vault techniques may be modeled according to the present invention.

Each secondary storage node may be abstracted into a set of parameters selected from data protection technique parameters listed in Table 1, which is provided as FIG. 2. In a hierarchical model, the secondary storage node i receives retrieval points from primary or secondary storage node (i−1) and retains a retention count $retCnt_i$ of retrieval points. The retrieval points may be maintained as full or partial copies and may be indicated by a copy representation $copyRep_i$. Each retrieval point is stored for a retention window $retW_i$. For each accumulation window $accW_i$, a new retrieval point is ready for propagation to the secondary storage node i. Each retrieval point may be held at node (i−1) for a hold window $holdW_i$ before being transferred during a propagation window $propW_i$, which is the time for transferring the retrieval point. In backup techniques, the propagation window is also known as the backup window. A propagation representation $propRep_i$ indicates whether a particular propagation of a retrieval point contains a full retrieval point or a partial retrieval point. Some techniques may use a cycle with multiple kinds of propagation representations. For example, tape backup may use a full propagation every weekend followed by a cumulative incremental every weekday. The number of secondary windows in the cycle may be denoted by a cycle count cycleCnt$_i$ and the time period for a cycle may be denoted as a cycle period cyclePer$_i$. Separate accumulation, propagation, hold, and retention windows may be specified for each of the secondary storage nodes.

Several conventions for the relationship between parameters for a storage node as well as the relationship between parameters for different nodes may improve performance of a storage system design. First, to maintain flow of data between nodes, the propagation window propW$_i$ should be no longer than the accumulation window accW$_i$. If the propagation window propW$_i$ is longer than the accumulation window accW$_i$, the successive propagation of retrieval points may cause a capacity overload, due to the need to store the retrieval point at the source secondary node before it is propagated. Second, because secondary storage nodes that are more removed from the primary storage node generally have larger storage capacity and longer propagation times, it is assumed that the more remote secondary storage nodes may retain more, and more infrequent, retrieval points; hence retCnt$_{i+j}$≧retCnt$_i$ and accW$_{i+j}$≧cyclePer$_i$. Thus, the range of time represented by the retrieval points at the more removed secondary storage nodes should be at least as long as the range at closer secondary storage nodes due to the longer accumulation windows or larger retention counts (or both) used at the more removed secondary storage nodes. Third, a destination hold window holdW$_{i+1}$ should generally be no longer than a source retention window retW$_i$ to avoid placing additional retention capacity demands for devices involved in providing the source secondary storage node.

It is observed that for a backup node that uses removable media and that acts as a source for another secondary storage node (e.g., a tape backup node i and remote vault node i+1), if holdW$_{i+1}$<retW$_i$, the node i must make an extra copy of the removable media to transfer the removable media in time. However, if holdW$_{i+1}$=retW$_i$, the existing removable media can be transferred, incurring no further bandwidth demands on the level i system.

Figure 3:
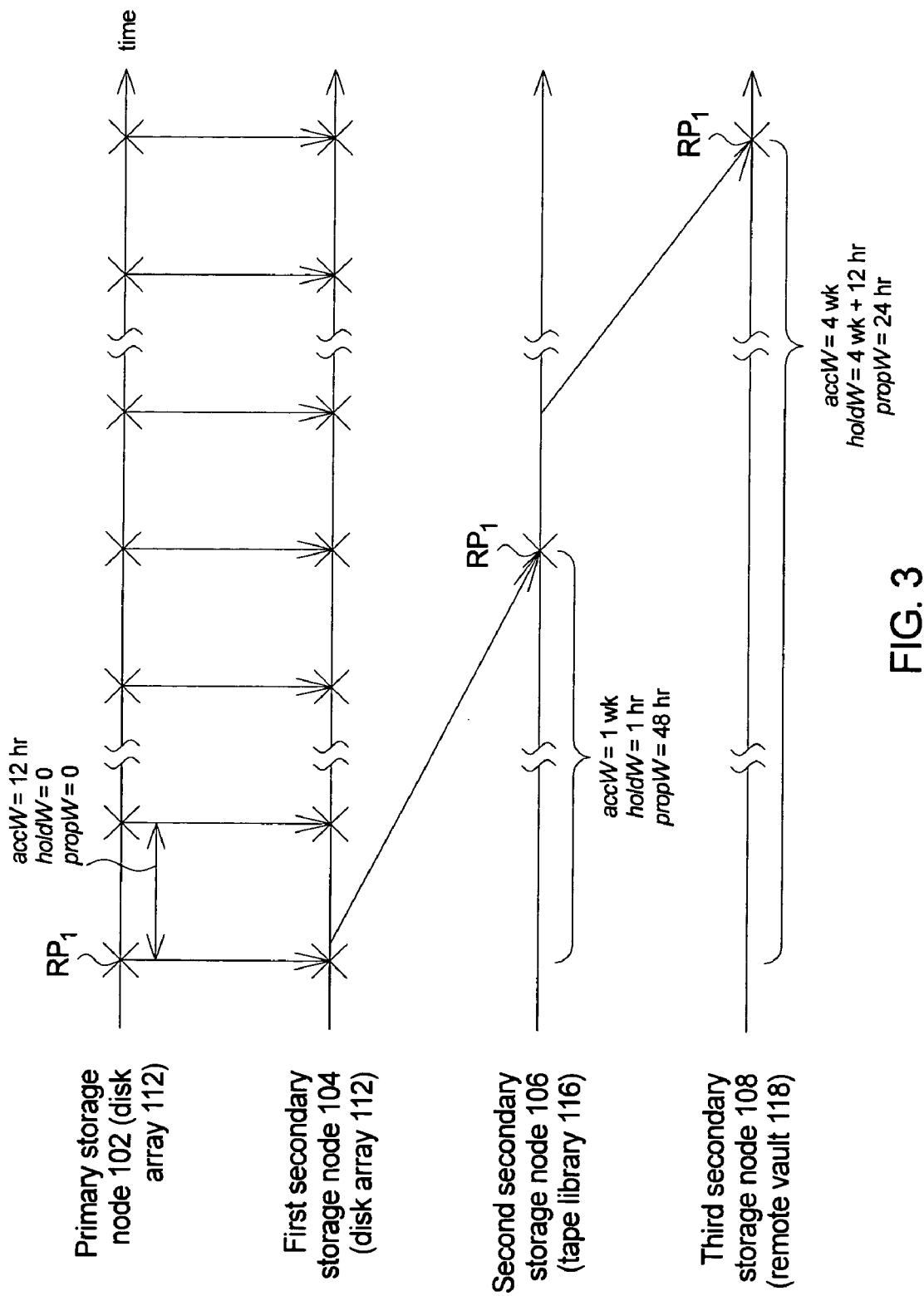
FIG. 3 is an exemplary timing diagram for propagation of retrieval points in an exemplary storage system design in accordance with embodiments of the present invention.

An embodiment of an exemplary timing diagram for propagation of the retrieval points in the exemplary storage system design 100 (FIG. 1) is provided as FIG. 3. The first secondary storage node 104 has an accumulation window accW$_1$ of twelve hours, which means that it generates split mirrors every twelve hours. The split mirrors are propagated immediately, which means that there is a negligible hold window holdW$_1$, and, since the primary and first secondary storage nodes, 102 and 104, share the disk array 112, there is a negligible propagation window propW$_1$. Each split mirror is retained for a retention window retW$_1$ of two days, resulting in a retention count retCnt$_1$ of four.

Once a week, a split mirror is used as a source for a retrieval point for the second secondary storage node 106 (i.e., to create a backup to the tape library 116). For ease of exposition, a simple backup policy is chosen that creates only full backups, using a one-week accumulation window accW$_2$ to accumulate updates, followed by a one-hour hold window holdW$_2$ and a 48-hour propagation window propW$_2$. Such a policy might have backup propagation begin at midnight on Saturday, and end at midnight on Monday. The second secondary storage node 106 (i.e., the tape library 116) retains each backup for a retention window retW$_2$ of four weeks.

Once every four weeks, as the backup retention window retW$_2$ expires, the oldest tapes are shipped offsite to the remote vault 118 (i.e., the third secondary storage node 108) via a mid-day overnight shipment, resulting in a remote vault accumulation window accW$_3$ that equals the backup retention window retW$_2$, a hold window holdW$_3$ of four weeks plus twelve hours, and propagation window propW$_3$ of 24 hours. The remote vault 118 retains each retrieval point for a retention window retW$_3$ of three years.

Figure 4:
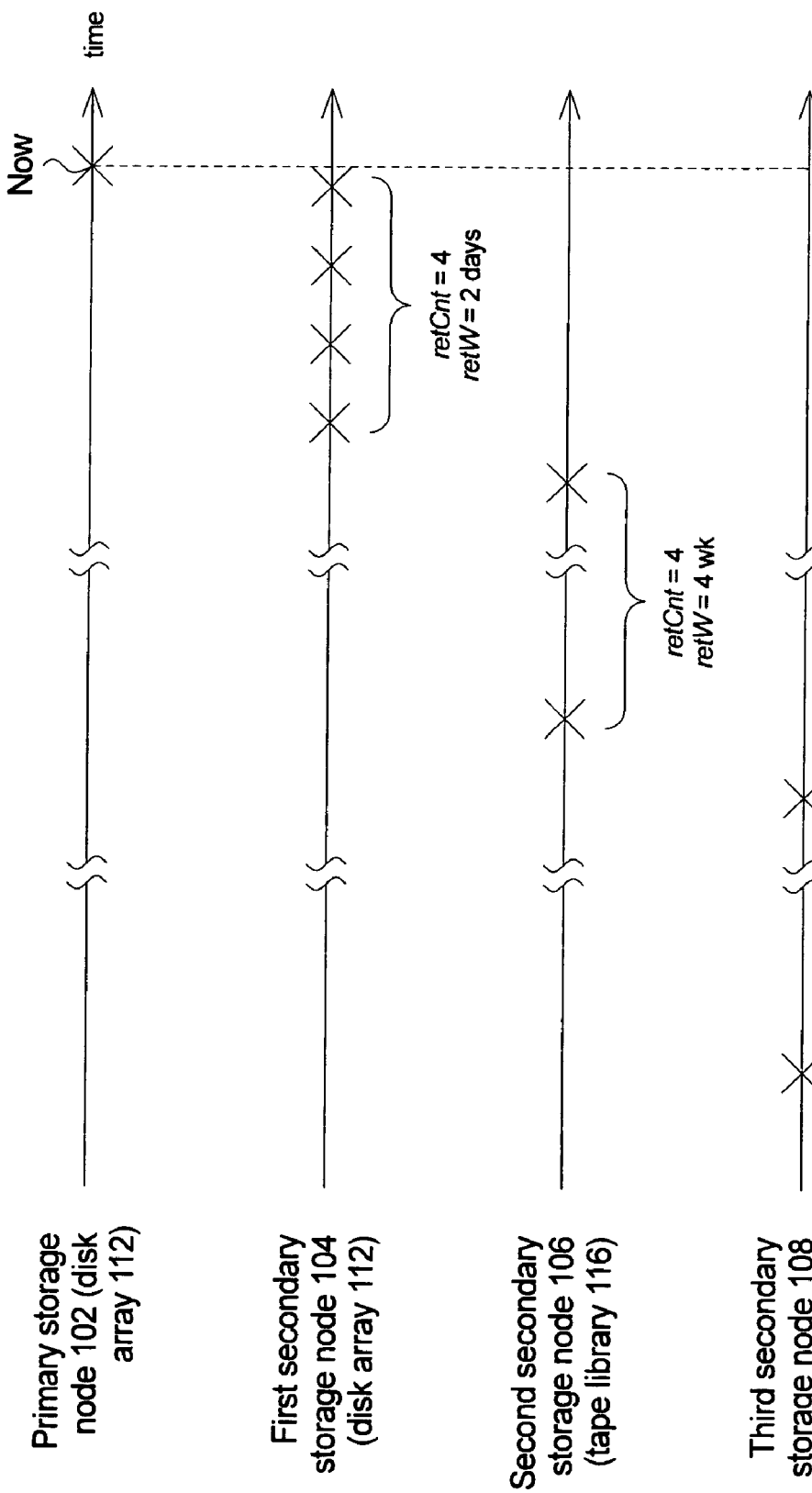
FIG. 4 is an exemplary time diagram showing creation times for retrieval points in an exemplary storage system design in accordance with embodiments of the present invention.

An embodiment of an exemplary time diagram showing creation times for the retrieval points in the exemplary storage system design 100 (FIG. 1) relative to the present time is provided as FIG. 4. The primary storage node 102 (i.e., the primary storage of the disk array 112) includes an indication of the present time as "now." The first secondary storage node 104 (i.e., the split mirror of the disk array 112) has a retention count retCnt$_1$ of four and a retention window retW$_1$ of two days. The second secondary storage node 106 (i.e., the tape library 116) has a retention count retCnt$_2$ of four and a retention window retW$_2$ of four weeks. The third secondary storage node 108 (i.e., the remote vault 118) has a retention count retCnt$_3$ of thirty-nine and a retention window retW$_3$ of three years.

The primary and secondary storage nodes employ hardware that includes storage devices and interconnect devices. Each storage device may be represented by a performance model to determine the storage device's bandwidth and capacity utilizations under normal operation. Each interconnect device may be represented by a performance model to compute the interconnect device's bandwidth utilization. Each storage and interconnect device may be represented by a cost model to compute outlay costs broken down by primary and secondary storage nodes.

The structure and operation of hardware devices may be abstracted into parameters selected from hardware device parameters listed in Table 2, which is provided as FIG. 5. Each storage device d may have an enclosure, bandwidth components (e.g., disks for disk arrays and tape drives for tape libraries), and capacity components (e.g., disks and tape cartridges). An enclosure may provide physical limitations on the number of bandwidth components (maxBWSlots$_d$), the number of capacity components maxCapSlots$_d$, and the aggregate device bandwidth (enclBW$_d$). Bandwidth components may have a maximum bandwidth value (slotBW$_d$), and capacity components may have a maximum capacity value (slotCap$_d$). Costs for a given device are calculated using fixed cost fixCost$_d$, capacity-dependent cost capCost$_d$ and bandwidth-dependent cost bwCost$_d$. Devices may also have an access delay devDelay$_d$ (e.g., tape load and seek time, interconnect propagation time). Similarly, the model for interconnect devices characterizes their bandwidth, delay, and costs. Physical transportation methods, such as courier services, may be included under interconnect devices.

Additionally, each storage and interconnect device may have a specified spare spareType$_d$ that should be used as a replacement if it fails. Each spare resource has its own device characteristics plus a provisioning time spareTime$_d$ that determines how quickly it is available for use and a cost computed using a discount factor spareDisc$_d$, relative to a dedicated, immediately available device. A dedicated hot spare may have a low provisioning time but no discount factor whereas a shared resource may have a considerable provisioning time with a discount factor. Thus, the cost of the shared resource may be correspondingly lower—a fraction of the actual full cost.

An embodiment of the step of modeling the storage system design determines bandwidth demands and storage capacity demands on hardware for propagation and retention of retrieval points. The propagation of the retrieval points imposes bandwidth demands as the workload data capacity (or a portion of it) is propagated. The retention of each retrieval points imposes a capacity demand of the workload data capacity or a portion of it. The determination of bandwidth and storage capacity demands may be used in the method of modeling storage system utilization. Each of the secondary storage nodes may be analyzed separately to determine the bandwidth demands and the storage capacity demands placed upon the hardware of the storage system design. Each secondary storage node may be characterized as a destination node with an associated source node (i.e., either the primary storage node or another secondary storage node). Each secondary storage node may be further characterized by an associated interconnect for transferring retrieval points from the associated source node to the secondary storage node. In some circumstances, a secondary storage node and its associated source node share a storage device, which means that there is no associated interconnect. In some other circumstances, an interconnect may have a significant overcapacity allowing it to be disregarded. For example, a courier service between a tape library and a remote vault will generally be able to transfer tapes without regard to the number of tapes.

The secondary storage nodes may employ any of a wide range of data protection techniques including a virtual snapshot technique for point-in-time copies, a split mirror for point-in-time copies, synchronous inter-array mirroring, asynchronous inter-array mirroring, asynchronous batch inter-array mirroring, a backup cycle of full and incremental backups (e.g., cumulative incremental backups or differential incremental backups or both), and remote vaulting.

An embodiment of the virtual snapshot technique employs a copy-on-write technique within a disk array to make point-in-time copies that share a single copy of un-modified data. For example, the point-in-time copies may share a primary disk array with a primary storage node. The primary disk array may employ an update-in-place variant of virtual snapshots for point-in-time copies, which assumes old values are copied to a new location before an update is performed, resulting in an additional read and write for every foreground workload write. Snapshots require sufficient additional capacity to store the unique updates accumulated during accW. Since the virtual snapshot technique takes place on a single disk array, there is not a separate source device for this technique nor is there an interconnect. The bandwidth demand may be given as two times the batch update rate for an accumulation window. The storage capacity demand may be given as the retention count times the window capacity where the window capacity is the batch update rate times the accumulation window. Mathematically, the bandwidth and storage capacity demands for the virtual snapshot technique may be given by:

$$bwDmd_{virtSnpsht}=2\times batchUpdR(accW)$$

$$capDmd_{virtSnpsht}=retCnt\times winCap$$

where $winCap=batchUpdR(accw)\times accW$

An embodiment of the split mirror for point-in-time copies assumes that a circular buffer of split mirrors is maintained with the least recently used mirror always undergoing resilvering (i.e., being brought up-to-date). As with the virtual snapshot technique, the split mirror shares a disk array with its source node. There are retCnt mirrors accessible and an additional split mirror is maintained to facilitate resilvering for a total of retCnt+1 mirrors. When a mirror becomes available for resilvering, the system must propagate all unique updates that have occurred since that mirror was last split retCnt+1 accumulation windows ago. This requires reading the new value from the primary copy and writing it out to the mirror. Mathematically, the bandwidth and storage capacity demands may be given by:

$$bwDmd_{spltMirr}=2\times(retCnt+1)\times batchUpdR(accW)$$

$$capDmd_{spltMirr}=(retCnt+1)\times dataCap$$

Generally, synchronous, asynchronous, or asynchronous batch inter-array mirroring will be employed by a secondary storage node that is a mirror of a primary storage node. Synchronous, asynchronous, and asynchronous batch inter-array mirroring place bandwidth demands on the interconnect links and the destination array (i.e., the disk array that holds the secondary storage node) as well as storage capacity demands on the destination array. The storage capacity demand on the destination array is the workload data capacity (i.e., the amount of data held in the primary storage array). Interconnect and destination array bandwidth demands vary between the different mirroring protocols. As many arrays support alternate interfaces for inter-array mirroring, it is assumed that no additional bandwidth requirements are placed on the source array's client interface. For the asynchronous variants, a negligible amount of buffering is used to smooth write bursts and coalesce updates; since this is a small fraction of the typical disk array cache, it is not explicitly modeled. For synchronous inter-array mirroring, the interconnect and destination array bandwidth demands may be given by the product of the average update rate and the burst multiplier:

$$bwDmd_{intrenet,destArray}=avgUpdR\times brstM$$

For asynchronous inter-array mirroring, the interconnect and destination array bandwidth demands may be given by the average update rate avgUpdR. And, for asynchronous batch inter-array mirroring, the interconnect and destination array bandwidth demands may be given by the batch update rate batchUpdR.

Generally, a secondary storage node employing a backup technique employs backup hardware, which may be referred to as a destination backup device. Backup places a bandwidth demand on both the source device to read the data as well as the destination backup device to write the data. If a backup cycle includes a full backup and cumulative incremental backups, the bandwidth for both the source device and the destination backup device may be given by the maximum bandwidth for a full backup to transfer an entire dataset during a full propagation window $propW_{full}$ or for the largest cumulative backup to transfer all updates incurred since the last full backup during a cumulative incremental propagation window $propW_{cummIncr}$. If a backup cycle also includes differential incremental backups, the model may be extended accordingly.

A backup places no capacity demands on the source array if another technique (e.g., a split mirror or a virtual snapshot) is employed to provide a consistent copy of the data. Capacity demands for the backup device include retCnt cycles' worth of data plus an additional full dataset copy. Each cycle includes one full backup plus cycleCnt cumulative incremental backups where each incremental backup in a cycle will generally be larger than the last. The additional full dataset copy avoids problems from failures that occur while a new full backup is being performed. Mathematically, the bandwidth demand on the source device, the interconnect, and the destination backup device may be given by:

$$bwDmd_{backup}=\max(dataCap/propW_{full}, maxCumIncr\text{-}Cap/propW_{cumIncr})$$

where $incrCap_x=accW_x \times batchUpdR(accW_x)$ and $maxIncrCap=incrCap_{full}+(cycleCnt-1) \times incrCap_{incr}$ Mathematically, the storage capacity demand on the destination backup device may be given by:

$$storCapDmd=(dataCap+totalIncrCap) \times retCnt+dataCap$$

where $totalIncrCap=cycleCnt \times (incrCap_{full}+(cycleCnt-1) \times incrCap_{incr}/2)$ Remote vaulting places no additional bandwidth or capacity demands on the tape backup device, provided that $hold_{vault}=retW_{backup}$. In the case that $hold_{vault}<retW_{backup}$, the backup device must make an additional copy of the tapes, so that they may be shipped offsite before the end of the retention window. It is assumed that only full backups are sent from the tape backup device to the remote vault. The storage capacity demand at the remote vault may be computed as the product of the retention count at the remote vault and the workload data capacity.

It will be readily apparent to one skilled in the art that numerous other data protection techniques described may be modeled according to the methods of the present invention including data protection techniques devised at some future time.

An embodiment of the step of modeling the storage system design includes determining location of retrieval points. The determination of the location of the retrieval points may be employed in the methods of estimating storage system reliability, availability, and cost. Estimating a data loss time period (i.e., reliability) and recovery time (i.e., availability) for a particular failure scenario includes a determination of a secondary storage node that holds a retrieval point that is closest to a recovery time target but that is not after the recovery time target. To do this, a determination may be first made as to the range of times of the retrieval points at each secondary storage node of the storage system design. A lower bound for the range of time at a secondary storage node may be determined by calculating a maximum time for a retrieval point to reach the secondary storage node. An upper bound for the range of time at the secondary storage node may be determined by calculating a sum of a minimum time for the retrieval point to reach the secondary storage node and a retention period for the retrieval point at the given secondary storage node.

A time for a retrieval point to reach a secondary storage node relative to a present time varies depending on when the most retrieval point arrived. For a secondary storage node that receives retrieval points from the primary storage node, the minimum time for the retrieval point to reach the secondary storage node is the hold window plus the propagation window, which may be given by holdW+propW. The maximum time is the sum of the hold window, the propagation window, and the accumulation window, which may be given by holdW+propW+accW. For a hierarchical model with increasing level numbers indicating secondary storage nodes further removed from the primary storage node, the range of time that indicates a difference between a present time and the time that a most recent retrieval point at level j was taken may be given by the following two equations:

$$minArrivalTime_j=\Sigma_{i=1}^{j}(holdW_i+propW_i)$$

$$maxArrivalTime_j=\Sigma_{i=1}^{j}(holdW_i+propW_i)+accW_j$$

The retention period for level j may be given by:

$$retPer_j=(retCnt_j-1)*cyclePer_j$$

Evaluation of a particular failure scenario should take into account that a failure may occur at anytime. Thus, when considering the propagation time and retention period for a retrieval point at a secondary storage node, it is the range of time that the retrieval point will be present at the secondary storage node that is of interest. For a secondary storage node that receives retrieval points from a primary storage node, the range of time that the retrieval points will be present at the secondary storage node assuming that the storage system is operating correctly up to the present time now may be given by:

$$retTimeRange=[(now-((retCnt-1)*cyclePer+holdW+propW))\ldots[(now-(holdW+propW+accW))]$$

For a hierarchical model with increasing level numbers indicating secondary storage nodes further removed from the primary storage node, the range of time that retrieval points will be present at a level j secondary storage node assuming that the storage system is operating correctly up to the present time now may be given by:

$$retTimeRange_j=[(now-((retCnt_j-1)*cyclePer_j+\Sigma_{i=1}^{j}(holdW_i+propW_i)))\ldots[(now-(\Sigma_{i=1}^{j}(holdW_i+propW_i)+accW_j))]$$

2. Estimating Storage System Utilization

Figure 6:
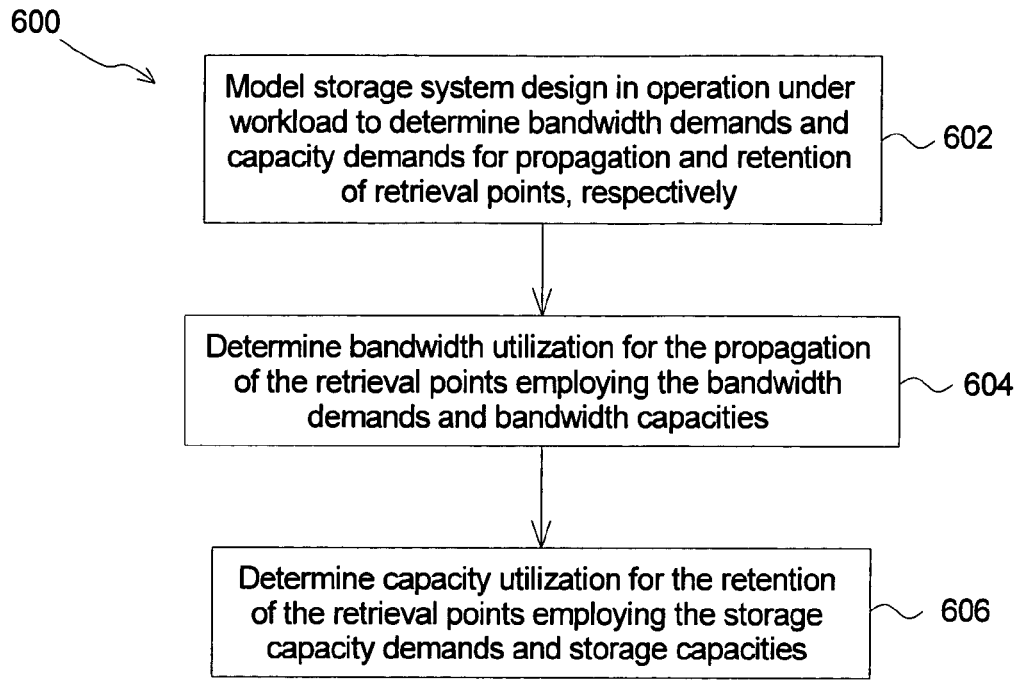
FIG. 6 illustrates an embodiment of a method of estimating storage system utilization of the present invention as a flow chart.

An embodiment of a computer-implemented method of estimating storage system utilization of the present invention is illustrated as a flow chart in FIG. 6. The method 600 begins with a first step 602 of modeling a storage system design in operation under a workload to determine propagation bandwidth demands and retention storage capacity demands for propagation and retention of retrieval points, respectively. The retrieval points provide sources for secondary storage recovery from a plurality of failure scenarios. The method 600 continues with a second step 604 of determining bandwidth utilization for the propagation of the retrieval points employing the propagation bandwidth demands and device bandwidth capacities. In an embodiment, the second step 604 of determining bandwidth utilization determines bandwidth utilization for each storage device of the storage system design. Mathematically, the determination of the bandwidth utilization $bwUtil_d$ for each storage device d of the storage system design may be given by:

$$bwUtil_d=\Sigma_{i=1}^{n}bwDmd_{d,i}/bwCap_d$$

where n is the number of secondary storage nodes, $bwDmd_{d,i}$ is the propagation bandwidth demand of the ith secondary storage node on the dth storage device and $bwCap_d$ is the device bandwidth capacity of the dth storage device, which may be computed as max(enclBW, maxBWSlots×slotBW). In an embodiment, the second step 604 also determines bandwidth utilization for interconnects of the storage system design.

A third step 606 determines capacity utilization for the retention of the retrieval points employing the retention storage capacity demands and device storage capacities. In an embodiment, the third step 606 of determining capacity utilization determines capacity utilization for each storage device of the storage system design. Mathematically, the determination of the capacity utilization $capUtil_d$ for each storage device d of the storage system design may be given by:

$$capUtil_d = \Sigma_{i=1}^{n} capDmd_{d,i}/devCap_d$$

where $capDmd_{d,i}$ is the retention storage capacity demand of the ith secondary storage node on the dth storage device and $capDmd_d$ is the device storage capacity of the dth storage device, which may be computed as maxCapSlots×slotCap.

The method of estimating storage system utilization determines whether the storage devices of the storage system design have sufficient bandwidth capacity and storage capacity to support the retrieval point propagation and retention of the secondary storage nodes of the storage system design. In an embodiment, the method 600 further includes a fourth step of determining a global bandwidth utilization for the storage system design. For example, the fourth step may identify a maximum bandwidth utilization for the storage devices of the storage system design as the global bandwidth utilization. In an embodiment, the method 600 further includes a fifth step of determining a global storage capacity utilization for the storage system design. For example, the fifth step may identify a maximum storage capacity utilization for the storage devices of the storage system design as the global storage capacity utilization. In an embodiment, the method 600 further includes a sixth step of evaluating the maximum bandwidth and storage capacity utilizations and, if either or both exceed a threshold (e.g., 80% or 100%), generating a error message indicating that the storage system design is not feasible.

3. Estimating Storage System Reliability

Figure 7:
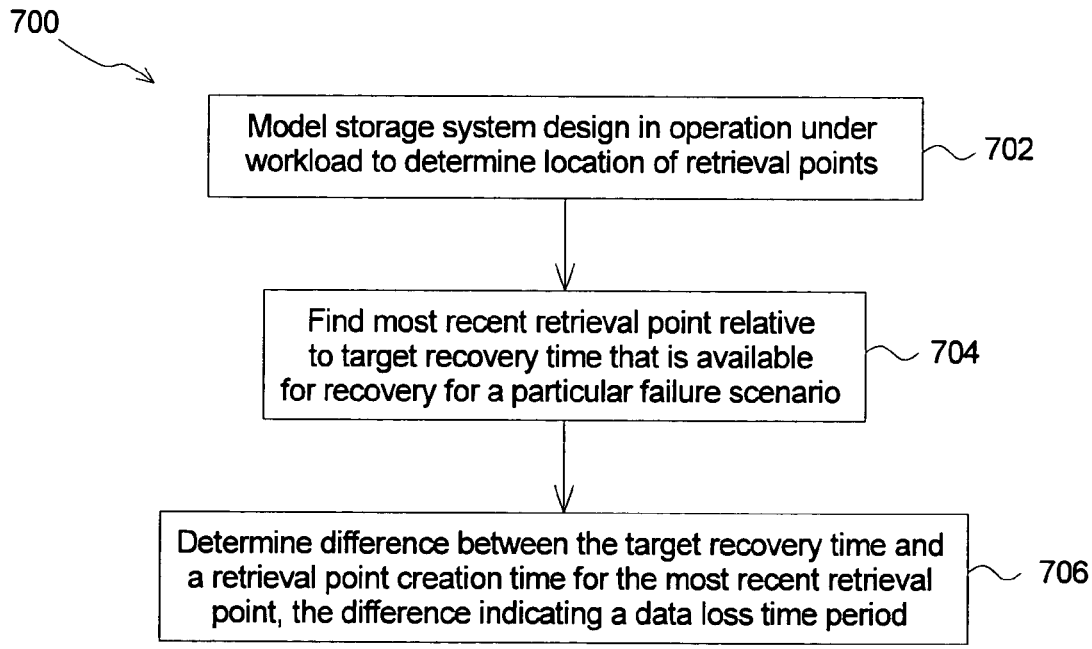
FIG. 7 illustrates an embodiment of a method of estimating storage system reliability of present invention as a flow chart.

An embodiment of a computer-implemented method of estimating storage system reliability of the present invention is as a flow chart in FIG. 7. Reliability may be characterized as an absence or minimization of data loss under a failure. A measure of reliability is a data loss time period. A product of the data loss time period and an average update rate may provide an estimation of the data loss.

The method 700 begins with a first step 702 of modeling a storage system design in operation under a workload to determine location of retrieval points. The retrieval points provide sources for primary storage recovery from a plurality of failure scenarios.

The method 700 continues with second step 704 of finding a most recent retrieval point relative to a target recovery time that is available for recovery for a particular failure scenario. To find the most recent retrieval point relative to the target recovery time, secondary storage nodes that are within a failure scope may be eliminated from consideration since these secondary storage nodes have also failed. Remaining secondary storage nodes may then be examined to find the most recent retrieval point relative to the target recovery time.

In a hierarchical model where successively higher level numbers indicate secondary storage nodes that are further removed from the primary storage, this may entail looking first to the secondary storage node having a lowest level number that is available as a source for recovery. If the retention period for the retrieval points at the lowest level number includes a time that precedes (or equals) the target recovery time, the most recent retrieval point relative to the target recovery time is available from the lowest level secondary storage node. If not, a next lowest level secondary storage that is available as a source of recovery is considered. Eventually, a source for the recovery is determined; or, an earliest available retrieval point follows the recovery target time. In the latter situation, no retrieval point is available for the recovery target time.

In a third step 706, a difference between the target recovery time and a retrieval point creation time for the most recent retrieval point is determined, which indicates a data loss time period.

An alternative embodiment of the method 700 further comprises fourth through sixth steps. In the fourth step, the second and third steps, 704 and 706, are performed for one or more additional failure scenarios to determine one or more additional data loss time periods. In the fifth step, the data loss time period for the particular failure scenario and the one or more additional data loss time periods are each weighted by a frequency of occurrence (i.e., a probability) to determine weighted data loss time periods. In the sixth step, the weighted data loss time periods are summed to determine an expected reliability for the particular failure scenario and the one or more additional failure scenarios.

Another alternative embodiment of the method 700 further comprises a seventh step. In the seventh step, a second data loss time period for another retrieval point at another secondary storage location is determined. The other retrieval point is a local most recent retrieval point for the other secondary storage location. The data loss time period and the second data loss time period form a reliability range. For example, if a storage system design includes both local point-in-time copies and a remote mirror, the most recent retrieval point will likely be at the remote mirror. The point-in-time copies are an alternate source for retrieval points and knowing the reliability of these retrieval points may be helpful.

4. Estimating Storage System Availability

Figure 8:
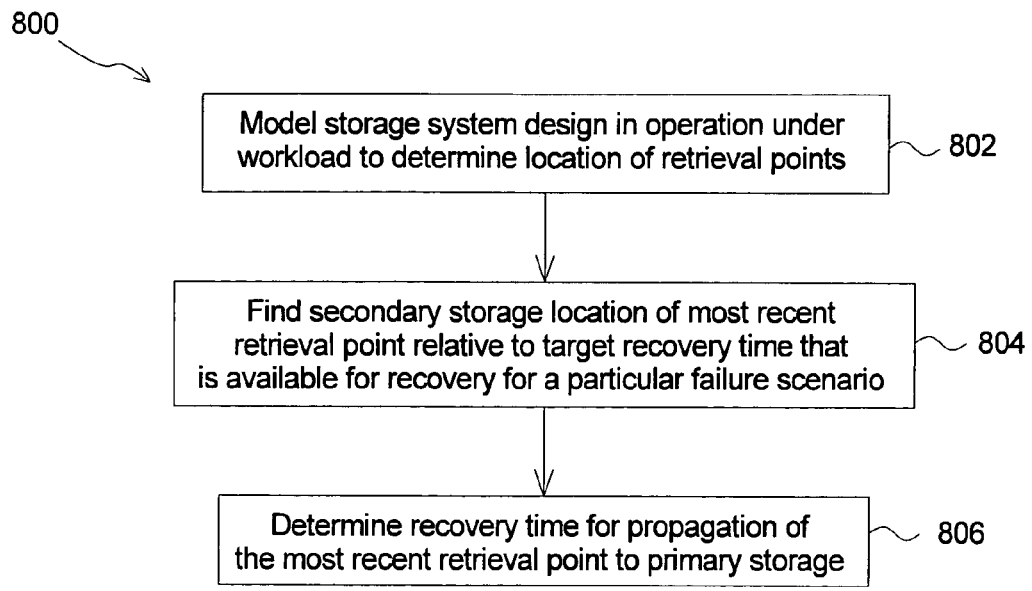
FIG. 8 illustrates an embodiment of a method of estimating storage system availability of the present invention as a flow chart.

An embodiment of a computer-implemented method of estimating storage system availability of the present invention is illustrated as a flow chart in FIG. 8. Availability may be characterized as the absence or minimization of recovery time for primary storage. A measure of availability is the recovery time.

The method 800 begins with a first step 802 of modeling a storage system design in operation under a workload to determine location of retrieval points. The retrieval points provide sources for primary storage recovery from a plurality of failure scenarios. The method continues with a second step 804 of finding a secondary storage location of a most recent retrieval point relative to a target recovery time that is available for recovery for a particular failure scenario.

In a hierarchical model of secondary storage nodes where higher level numbers indicate secondary storage nodes that are further removed from the primary storage, this entails looking first to the secondary storage node having a lowest level number that is available as a source for recovery. If the retention period at the lowest level includes a time that precedes (or equals) the target recovery time, the most recent retrieval point relative to the target recovery time is available from the lowest level secondary storage node. If not, a next lowest level secondary storage that is available as a source of recovery is considered. Eventually, a source for the recovery is determined; or, an earliest available retrieval point follows the recovery target time. In the latter situation, no retrieval point is available for recovery.

In a third step 806, a recovery time for propagation of the most recent retrieval point (i.e., a target retrieval point) from the secondary storage location to primary storage is determined. The propagation of the most recent retrieval point may include identifying a recovery path and performing tasks. As a default, the recovery path may be the reverse of the propagation path. The recovery path may include skipping one or more secondary storage nodes of the propagation path. In a hierarchical model, the tasks that are to be performed sequentially at each level of the hierarchy may be identified and tasks at different levels that may be performed in parallel may also be identified. Performing tasks in parallel where possible minimizes the recovery time and, thus, is desirable.

An alternative embodiment of the method 800 further comprises fourth through sixth steps. In the fourth step, the second and third steps, 804 and 806, are performed for one or more additional failure scenarios to determine one or more additional recovery times. In the fifth step, the recovery time for the particular failure scenario and the one or more additional recovery times are each weighted by a frequency of occurrence (i.e., a probability) to determine weighted recovery times. In the sixth step, the weighted recovery times are summed to determine an expected availability for the particular failure scenario and the one or more additional failure scenarios.

Another alternative embodiment of the method 800 further comprises a seventh step. In the seventh step, a second recovery time for another retrieval point at another secondary storage location is determined. The other retrieval point is a local most recent retrieval point for the other secondary storage location. The recovery time and the recovery time form an availability range. For example, if a storage system design includes both local point-in-time copies and a remote mirror, the most recent retrieval point will likely be at the remote mirror. The point-in-time copies are an alternate source for retrieval points and knowing the availability of these retrieval points may be helpful.

Figure 9:
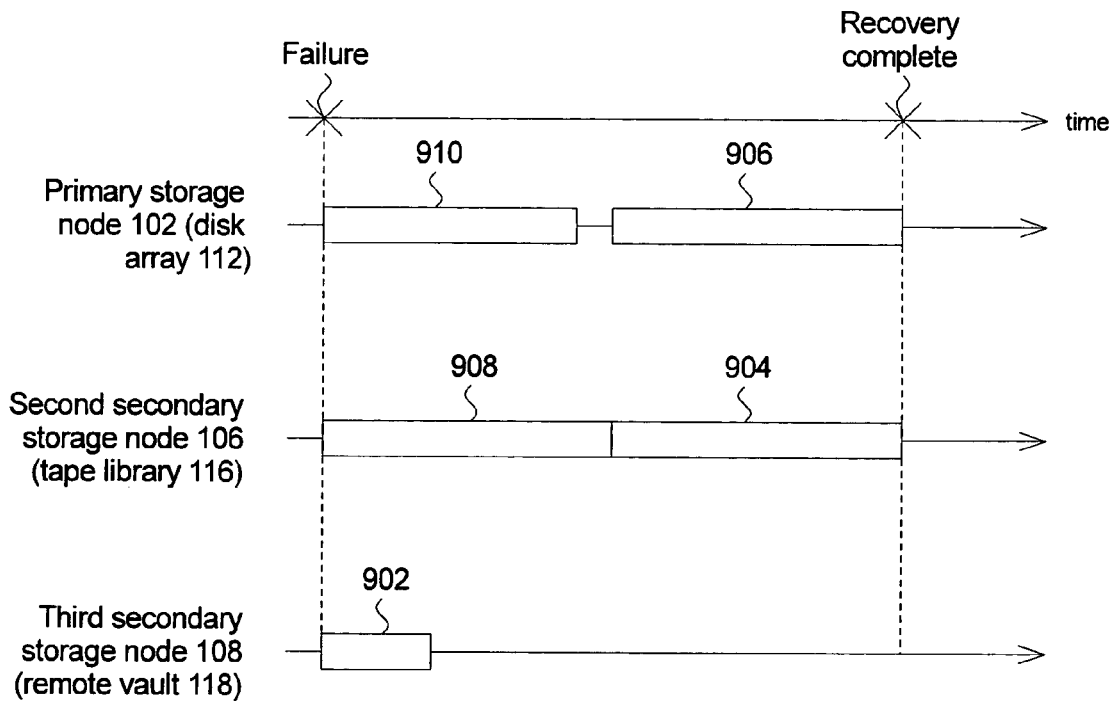
FIG. 9 is a task chart for an exemplary recovery path in accordance with an embodiment of the present invention.

An embodiment of tasks that may be performed for an exemplary recovery path is illustrated as a task chart in FIG. 9. The tasks for the exemplary recovery path restore the primary storage node 102 of the exemplary storage system design (100). In this example, there is a site failure that includes loss of the disk array 112 and the tape library 116 leaving the remote vault 118 (i.e., the third secondary storage node) as a source of the most recent retrieval point.

The exemplary recovery path includes a first task 902 of retrieving tapes from the remote vault 118 (i.e., the third secondary storage node), a second task 904 of reading the tapes at the tape library 116 (i.e., the second secondary storage node), and a third task 906 of restoring primary storage node 102 of the disk array 112. The second and third tasks, 904 and 906, are inherently parallel tasks because the data is written to the disk array 112 as it is read from the tapes in the tape library 116. Since restoring the first secondary storage node 104 does not improve the recovery path, it may be skipped. A fourth task 908 of reprovisioning the tape library 116 and a fifth task 910 of reprovisioning the disk array 112 takes place before the tapes can be read at the tape library 116 and the data can be restored to the disk array 112. The fourth and fifth tasks, 908 and 910, of reprovisioning may potentially take a long time. Here, it is assumed that the fourth and fifth tasks, 908 and 910, of reprovisioning of the tape library 116 and reprovisioning of the disk array 112 may take place in parallel with the first task 902 of shipment of the tapes from the remote vault 118. Recovery completes once the data is transferred from the tapes to the disk array 112. Thus, the first task 902 of shipment of the tapes, the fourth task 908 of reprovisioning of the tape library 116, and the fifth task 910 of reprovisioning of the disk array may take place in serial or parallel, preferably the latter.

More generally, the recovery time for the particular failure scenario may be abstracted into parallelizable fixed-period tasks parFix, serialized fixed-period tasks serFix, and serialized per-byte-period tasks serXfer. The parallelizable fixed-period tasks parFix are performed in preparation for data arrival and may include device reprovisioning, device reconfiguration, and negotiation for access to shared resources. The serialized fixed-period tasks serFix may be started only after data arrives. For example, the serialized fixed-period tasks serFix may include tape load and seek times. The serialized per-byte-period tasks serXfer are data transfer operations, which may begin only when both the sender and receiver are ready. The transfer rate is limited to the minimum of the sender available bandwidth, the interconnect available bandwidth, and the receiver available bandwidth. For example, the available bandwidth may be bandwidth that remains after any retrieval point propagation workload demands have been satisfied.

In a hierarchical model, the recovery time can be computed recursively by determining the time at which each level is ready to serve as a source for the data. A level may be ready to serve as a source for the data once it has received the transmission from its source level after suitable parallelizable preparation of both levels and may be followed by an additional serialized fixed preparation performed once the data arrives. The recovery time for a given level i, $RT_i$, may be given by:

$$RT_i = \max(RT_{i+1}, parFix_i) + serXfer_i + serFix_i$$
$$= \max(RT_{i+1}, parFix_i) + \frac{recSize}{\min(devBW_{src}, devBW_{intrcnct}, devBW_{dest})} + serFix_i$$

where recSize is the amount of data to be recovered and $devBW_x$ is the available bandwidth for the device. The overall recovery time is the recovery time for the primary storage node (e.g., $RT_0$).

5. Estimating Storage System Cost

Figures 10, 16:
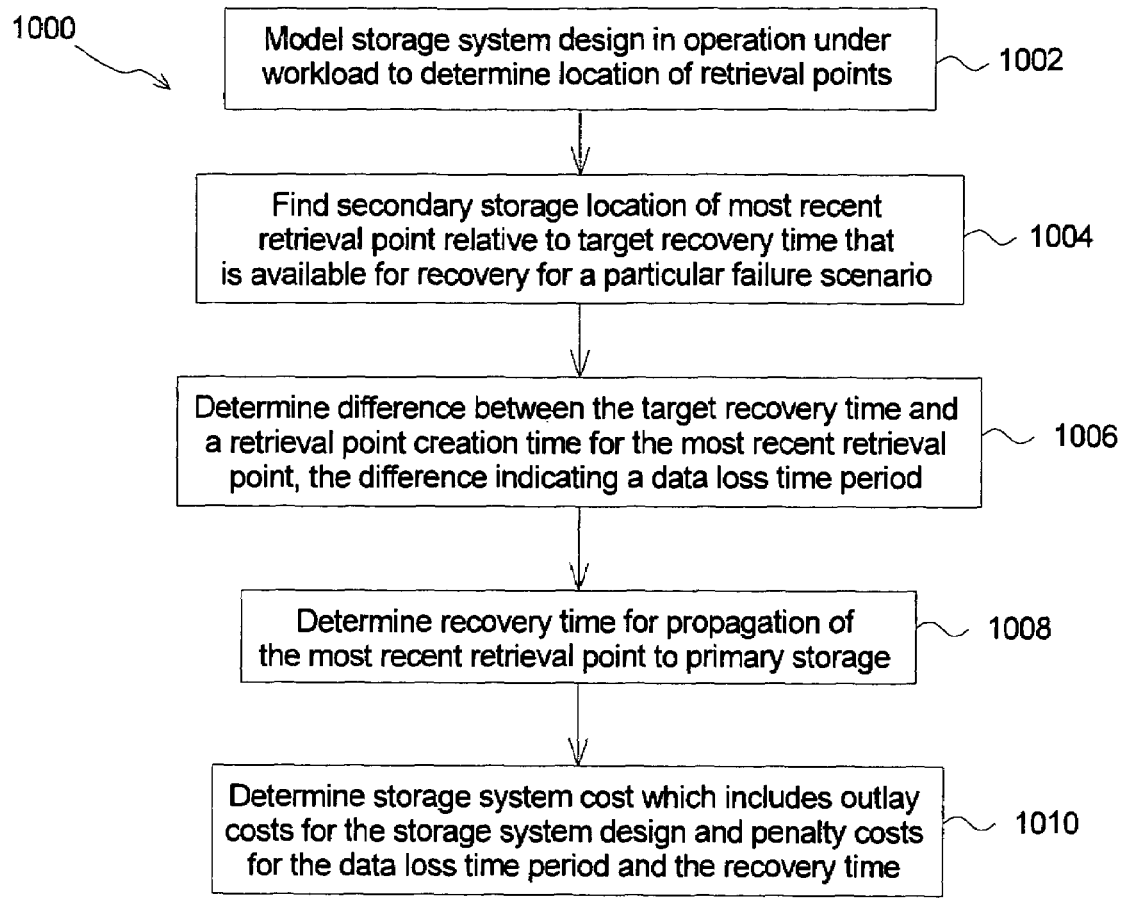
FIG. 10 illustrates an embodiment of a method of estimating storage system cost of the present invention as a flow chart.
FIG. 16 is a table of estimates of dependability for a baseline storage system design in accordance with exemplary embodiments of the present invention.

An embodiment of a computer-implemented method of estimating storage system cost of the present invention is illustrated as a flow chart in FIG. 10. The method 1000 begins with a first step 1002 of modeling a storage system design in operation under a workload to determine location of retrieval points. The retrieval points provide sources for primary storage recovery from a plurality of failure scenarios. The method 1000 continues with a second step 1004 of finding a most recent retrieval point relative to a target recovery time that is available for recovery for a particular failure scenario.

In a third step 1006 a difference between the target recovery time and a retrieval point creation time for the most recent retrieval point is determined, which indicates a data loss time period. In a fourth step 1008, a recovery time for propagation of the most recent retrieval point to primary storage is determined. Determination of the data loss time period and the recovery time are discussed above relative to the methods of estimating storage system reliability and availability, respectively.

In a fifth step 1010, a storage system cost is determined. The storage system cost includes outlay costs for the storage system design and penalty costs for the data loss time period and the recovery time.

A cost model for the storage system design includes outlay costs and penalty costs, which may be determined on per-period basis (e.g., per-annum basis) or a total basis. The outlay costs may cover expenditures for direct and indirect costs such as equipment, facilities, service contracts, salaries, spare resources, and insurance. Penalties may be incurred when objectives for the data loss time period or recovery time are violated.

The outlay costs may be calculated for each secondary storage node employing the device models for the secondary storage node. This allows details of device internal characteristics to be localized inside the hardware device models. Most device-specific capital expenditures have fixed costs, per-capacity costs, and per-bandwidth costs. Fixed costs may include disk array or tape library enclosure costs, service costs, fixed facility costs (e.g., floorspace cost), purchase or rental costs, and base air conditioning costs. Per-capacity costs may include disks, tape media, floorspace-dependent costs, variable cooling costs, power costs, and variable service costs. Per-bandwidth costs include disk costs, tape drive costs, and interconnect link costs.

Each device may be modeled as having a particular node (e.g., the primary storage node or a secondary storage node) as its primary cost driver and another node or nodes as ancillary cost drivers. For example, if a disk array serves as the hardware device for the primary storage and a split mirror secondary storage node, its primary cost driver may be the primary storage node and its ancillary cost driver may be the split mirror secondary storage node. The fixed costs plus relevant per-capacity and per-bandwidth costs are allocated to the primary cost driver. The additional per-capacity and per-bandwidth costs associated with secondary cost driver or drivers (i.e., the additional node or nodes employing the hardware device) may be allocated to the node or nodes that are the secondary cost driver or drivers. Spare resource costs may be allocated to storage nodes in a similar fashion.

Objectives for reliability (i.e., data loss time period) and availability (i.e., recovery time) may be expressed as a recovery point objective and a recovery time objective, respectively, either of which may be set to zero. The consequences of violating the recovery point objective or the recovery time objective may be assessed through the data loss penalty cost or the recovery time penalty cost, respectively.

A data loss penalty cost may be determined from a product of the data loss time period and a data loss penalty rate. A recovery time penalty cost may be determined from a product of the recovery time and a recovery time penalty rate. More generally, the data loss penalty cost and the recovery time penalty cost are determined from a data loss penalty function and a recovery time penalty function. Such functions include a linear function, a step function, an exponential function, and a table lookup function.

An alternative embodiment of the method 1000 further comprises sixth through eighth steps. In the sixth step, the second through fifth steps, 1004 and 1010, are performed for one or more additional failure scenarios to determine one or more additional storage system costs. In the seventh step, the storage system cost for the particular failure scenario and the one or more additional storage system costs are each weighted by a frequency of occurrence (i.e., a probability) to determine weighted storage system costs. In the eighth step, the weighted storage system costs are summed to determine an expected storage system cost for the particular failure scenario and the one or more additional failure scenarios.

Another alternative embodiment of the method 1000 includes ninth through eleventh steps. In the ninth step, a second recovery time for another retrieval point at another secondary storage location is determined. The other retrieval point is a local most recent retrieval point for the other secondary storage location. In the tenth step, a second data loss time period for another retrieval point at another secondary storage location is determined. The other retrieval point is a local most recent retrieval point for the other secondary storage location. In the eleventh step, a second storage system cost is determined. The second storage system cost includes other penalty costs for the second data loss time period and the second recovery time. For example, if a storage system design includes both local point-in-time copies and a remote mirror, the most recent retrieval point will likely be at the remote mirror. It may be that the increase in the penalty cost for the data loss time period may be less than the decrease in the penalty cost for the recovery time, making the point-in-time copies a more economical choice than recovery from the remote mirror.

6. Exemplary Embodiments

An exemplary case study is presented here to illustrate the operation of the present invention. The exemplary case study (i.e., exemplary embodiments of the present invention) begins by examining a baseline configuration in detail, and then explores several what-if scenarios to improve the dependability (i.e., reliability and availability) and the cost of the storage system design. The exemplary case study demonstrates that the quantitative results produced are reasonable, and that the methods of the present invention are flexible and useful in designing a storage system that meets dependability objectives.

The exemplary case study models a workgroup storage server, which has measured characteristics that are presented in Table 3, which is provided as FIG. 11. The storage system design is based on a hierarchy of primary storage node, a split mirror for a first secondary storage node, a tape backup for a second secondary storage node, and a remote vault for a third secondary storage node. A summary of the data protection techniques for the secondary storage nodes of the storage system design is presented in Table 4, which is provided as FIG. 12. Table 5, which is provided as FIG. 13, presents device configuration parameters and cost models for the hardware devices of the storage system design. The cost models include fixed costs; per-capacity costs, where c is in GB; per-bandwidth costs, where b is in MB/s; and per-shipment costs for the remote vault. The costs are based on annualized hardware device costs using a three-year depreciation and facilities costs. The hardware costs are based on list prices or expert estimates circa mid-2004. Each of the data loss time period penalty rate and the recovery time penalty rate are %50,000 per hour.

The storage system design employs hot spare resources at the primary site, as well as a remote shared recovery facility. Hot spare resources take 60 seconds to provision, and cost the same as the original resources. Remote hosting facility resources can be provisioned (e.g., drained of other workloads and scrubbed) within nine hours. Because the resources are shared, they cost 20% of the original, dedicated resources.

Three failure scenarios are considered including a data object failure, an array failure, and a site failure. The data object failure simulates a user mistake or software error that corrupts a 1 MB data object leading to a recovery time target of 24 hours in the past. The recovery path for the data object failure is from the split mirror to the primary storage node. The array failure simulates failure of the primary array, and the site failure simulates a disaster at the primary site. Both require recovery of the entire dataset to its most recent state. The disk array failure uses a recovery path of the remote vault to the tape backup and then tape backup to the primary storage node. The site failure uses a recovery path of the remote vault, tape backup, and primary storage node.

The bandwidth and capacity demands that the secondary storage nodes place on the hardware devices to propagate and maintain retrieval points are graphically illustrated in FIGS.

14 and 15. The disk array and tape library bandwidth capacities serve the workload bandwidth demand 1402 (e.g., the workload imposed by clients of the workgroup storage server), the split mirrors bandwidth demand 1404, and the tape backup bandwidth demand 1406. It is assumed that the disk array is always resilvering one of the split mirrors, which generates read and write demands on the disk array. The full-only backup policy dictates that the entire dataset be transferred during a propagation window, which generates a read workload on the disk array and a write workload on the tape library. The remote vault's accumulation window is the same as the backup retention window, meaning that the oldest full backup can be shipped offsite when its retention window expires. Thus, the remote vault places no additional bandwidth requirements on the tape library. The total average bandwidth demands are 12.4 MB/s for the disk array and 8.1 MB/s for the tape library. This results in an overall system bandwidth utilization of 4%, which is the maximum bandwidth utilization for any of the hardware devices of the storage system design.

The capacity requirements imposed on each device may be determined from the retention window and copy representation type for each level. The disk array stores the primary dataset 1502 and five split mirrors 1504, each of which is a full copy of the primary dataset. The total array capacity requirements are 8.0 TB, which can be satisfied by 113 disks. The tape library maintains four full backups 1506, corresponding to a total of 6.6 TB, which may be provided by 18 tapes. Finally, the remote vault maintains 39 full backups 1508, corresponding to 51.8 TB, which may be provided by 156 tapes. The resulting overall system capacity utilization is 88%, which is the maximum capacity utilization for any of the hardware devices of the storage system design.

Estimates of dependability for the baseline storage system design for the three failure scenarios are presented in Table 6, which is provided as FIG. 16. For the data failure scenario, the day-old recovery time target is maintained at the split mirror level and can be easily restored by an intra-array copy, which results in a negligible recovery time. The worst case data loss time period is twelve hours, because it is not clear where "24 hours ago" falls in the cycle of split mirror retrieval point creation. In other words, it may be that a retrieval point was created immediately following the recovery time target (e.g., 11 hours, 59 minutes ago) leading to a split mirror that has a next older retrieval point (e.g., a retrieval point created 23 hours, 59 minutes ago).

For the disk array failure, the primary storage nodes and the split mirror secondary storage node are lost when the disk array fails, leading to a recovery from the tape library. The transfer time for the data from tape to the disk array dominates the 2.4-hour recovery time for the disk array. The worst case data loss time period is one week, two days and one hour, equivalent to the time lag of the backup level (i.e., hold windows plus propagation windows plus accumulation window).

For the site failure, recovery proceeds from tapes stored at the remote vault. Reprovisioning of site resources (by securing access to remote resources at the shared hosting facility), can proceed in parallel with the shipment of tapes from the remote vault. Upon tape arrival and provisioning of the new site, data transfer from the new tape library to the new disk array takes 2.4 hours, which results in a recovery time of 26.4 hours. The worst case data loss time period is eight weeks, three days, and thirteen hours.

Figure 17:
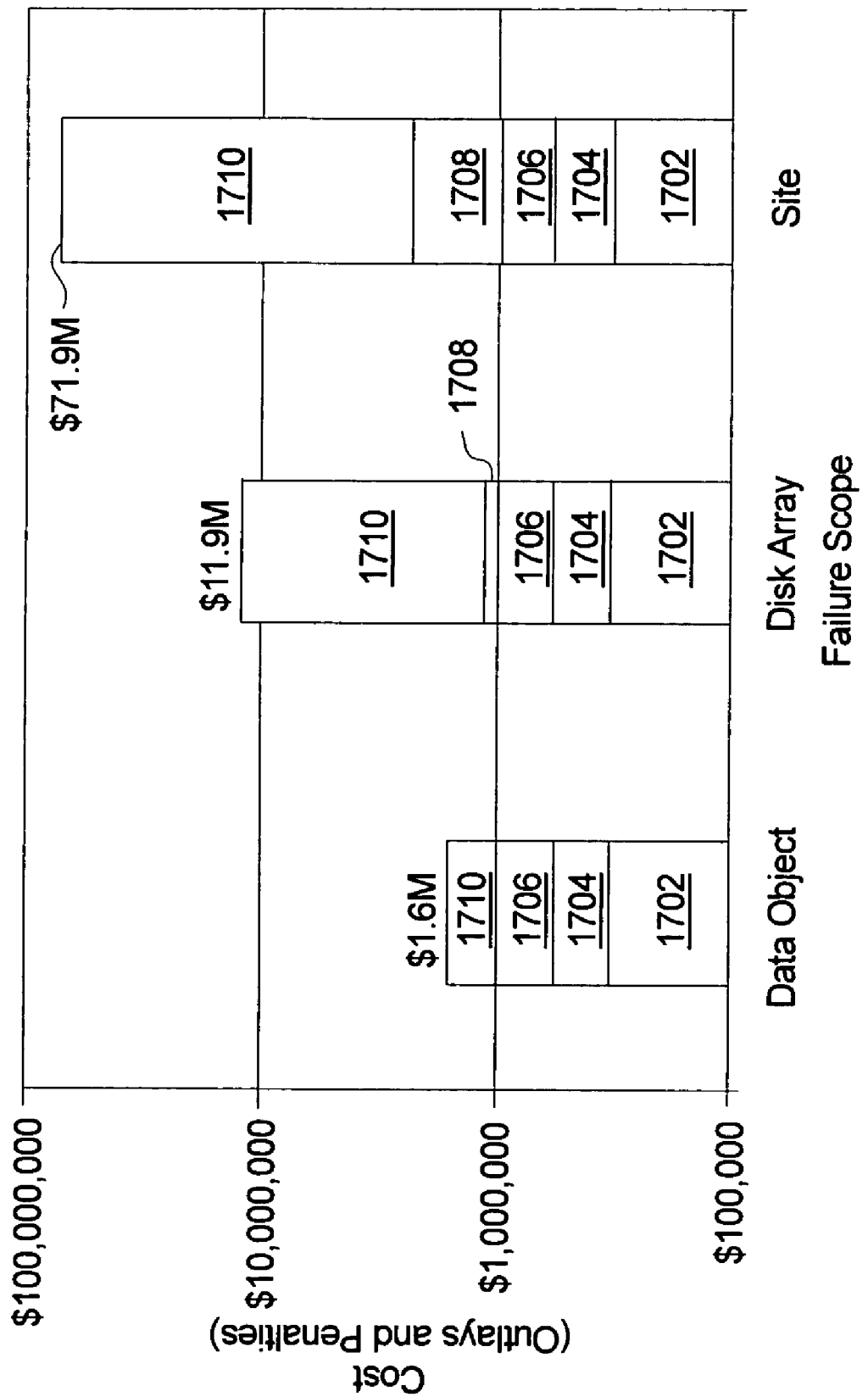
FIG. 17 is a graph depicting costs for failure scenarios in accordance with exemplary embodiments of the present invention.

The costs for each failure scenario including the outlay costs as well as penalties are presented graphically in FIG. 17. Outlay costs are split roughly evenly between the foreground workload 1702, split mirroring 1704, and tape backup 1706, with negligible contribution from remote vaulting (not indicated in FIG. 17). It is observed that penalty costs and (in particular, the data loss time period penalties 1710) dominate for the disk array failure and the site failure, due to the large lag times for the retrieval points present at the tape library and the remote vault. The recovery time penalty cost 1708 is negligible for the data object failure but contributes slightly to the disk array failure and more substantially to the site failure.

Several what-if scenarios (i.e., alternatives) intended to improve the dependability of the storage system design are presented in Table 7, which is provided as FIG. 18. In Table 7, RT indicates recovery time and DLTP indicates data loss time period. Weekly vaults have a weekly accumulation window and a 12-hr hold window. Full and incremental backups have weekly full backups and daily cumulative incremental backups, with a 48-hr accumulation window and a 48-hr propagation window for full backups, a 24-hr accumulation window and a 12-hr propagation window for incremental backups, and a cycle count of 5. Daily full backups have a 24-hr accumulation window and a 12-hr propagation window. Snapshots indicate the use of snapshots instead of split mirrors. AsyncB mirror indicates the use of asynchronous batch mirroring with a 1-min accumulation window over 155 Mbps OC-3 links, with a cost model of b*23535 (where b is in MB/s). If not explicitly specified, parameters for alternatives are the same as in the baseline configuration.

For site disasters, one alternative for reducing the data loss time period and its associated penalty is to modify the remote vaulting policy. Reducing the hold window means that tapes would be shipped offsite before the tape backup retention window has expired, requiring extra tape library bandwidth to create a second copy of the backups. Shortening the accumulation window would reduce the interval between retrieval points, thus limiting the data loss time period. Assuming that a retention window of the same duration is desired, this would increase the capacity demands at the vault. Table 7 shows that such a weekly vaulting policy reduces the site failure data loss time period and the associated penalties.

Adding daily cumulative incremental backups to the weekly full backups and weekly shipments to the remote vault provides no benefit for the site failure but decreases the data loss time period and associated penalties for the disk array failure. This savings comes at the cost of slightly increased recovery time, due to the need to restore both a full backup and an incremental backup in the worst case. If daily full backups are used, the disk array failure recovery time and data loss time period decrease. The site failure data loss time period also decreases due to the shorter propagation window for the daily full backups, which means that the remote vault's time lag is smaller than for the baseline storage system design. A further, albeit modest, outlay cost savings can be achieved if virtual snapshots are used instead of split mirrors.

Another alternative for reducing the data loss time period is to employ an asynchronous batch inter-array mirror, which is located at a remote site and which uses shorter accumulation and hold windows. The worst case data loss time period for the disk array failure and the site failure decreases to only two minutes. If a single wide-area network link is used, transfer time dominates the recovery time. However, if ten links are used, recovery time can be reduced significantly. The site failure recovery time is greater than the disk array failure recovery time, however, because of the longer delay to provision spare resources at the shared recovery site. Ironically, the lowest total cost comes from the single-link mirroring system, even though it has a higher recovery time penalty, because its outlay costs are considerably lower.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A computer-implemented method of estimating storage system availability comprising the steps of:
   modeling a storage system design in operation under a workload by employing a hierarchical model to determine location of retrieval points, the hierarchical model having levels corresponding to each of a primary storage location and a plurality of secondary storage locations, the primary and secondary storage locations serving as sources for retrieval points of successively lower levels of the hierarchical model, and the retrieval points providing sources for primary storage recovery for a plurality of failure scenarios; and
   for a particular failure scenario:
      receiving a target recovery time, which is a point-in-time to which restoration of data is desired;
      finding a secondary storage location from among the plurality of secondary storage locations of a most recent retrieval point relative to the target recovery time that is available for recovery; and
      determining a recovery time for propagation of the most recent retrieval point from the identified secondary storage location to the primary storage location by determining a recovery path from the identified secondary storage location to the primary storage location and recursively computing a time at which each level in the recovery path is ready to serve as a source for the data.

2. The method of claim 1 wherein the workload comprises a workload capacity demand.

3. The method of claim 2 wherein the workload further comprises an average access rate.

4. The method of claim 2 wherein the workload further comprises an average update rate.

5. The method of claim 2 wherein the workload further comprises a ratio of peak update rate to the average access rate.

6. The method of claim 2 wherein the workload further comprises a batch update rate.

7. The method of claim 1 wherein the step of finding the secondary storage location for the most recent retrieval point relative to the target recovery time that is available for the recovery includes considering secondary storage locations having successively older retention periods for the retrieval points until the most recent retrieval point is found.

8. The method of claim 1 further comprising:
   determining additional recovery times for one or more additional failure scenarios;
   weighting each recovery time for the particular failure scenario and the one or more additional failure scenarios by a probability of occurrence to determine weighted recovery times; and
   summing the weighted recovery times to determine an expected availability for the particular failure and the one or more additional failure scenarios.

9. The method of claim 1 wherein the step of determining the recovery time for the propagation of the most recent retrieval point from the secondary storage location to the primary storage location includes calculating a data transfer time for data to travel the recovery path.

10. The method of claim 1 wherein the step of determining the recovery time for propagation of the most recent retrieval point includes determining a provisioning time for replacing or repairing failed hardware.

11. The method of claim 1 wherein the step of determining the recovery time including the data transfer time and the provisioning time accounts for parallelizable tasks among the levels of the hierarchical model corresponding to the secondary locations.

12. The method of claim 1 wherein the recovery time is a first recovery time and further comprising determining a second recovery time for propagation of another retrieval point from another secondary storage location to the primary storage for the particular failure scenario, the other retrieval point comprising a local most recent retrieval point for the other secondary storage location, the first and second recovery times forming an availability range.

13. The method of claim 1 wherein the primary storage location and the secondary storage locations are arranged as a branched hierarchy.

14. The method of claim 1 wherein each of the secondary storage locations employs a data protection technique.

15. The method of claim 1 wherein the secondary storage locations are selected from a snapshot, a split mirror, a local mirror, a remote mirror, a wide-area mirroring system, a wide-area erasure coding system, a backup system, and a vault for storage of backup media.

16. The method of claim 1 wherein the particular failure scenario is selected from a data object failure, a partial failure of the primary storage, a complete failure of the primary storage, a site failure, and a region failure.

17. The method of claim 1 wherein the primary storage comprises a disk array.

18. The method of claim 1 wherein the primary storage comprises a plurality of disk arrays.

19. The method of claim 1 wherein a first secondary storage node comprises a mirror.

20. The method of claim 19 wherein the mirror is selected from a local mirror and a remote mirror.

21. The method of claim 19 wherein the mirror is selected from a synchronous mirror, an asynchronous mirror, and a batched asynchronous mirror.

22. The method of claim 1 wherein a first secondary storage location comprises virtual snapshots.

23. The method of claim 1 wherein a first secondary storage location comprises point-in-time copies.

24. The method of claim 23 wherein the point-in-time copies employ a split mirror and configuration parameters for the split mirror include the split mirror occasionally splitting a point-in-time copy of primary storage data to form the retrieval points.

25. The method of claim 24 wherein the configuration parameters include that at a given time the split mirror maintains a first subset of the retrieval points and resilvers a portion of the split mirror for splitting a next point-in-time copy of the primary storage data to form a next retrieval point.

26. The method of claim 25 wherein the split mirror occasionally propagates a first-level retrieval point from the split mirror to a second-level secondary storage location.

27. The method of claim 26 wherein the second-level secondary storage node comprises a backup system.

28. The method of claim 27 wherein backups for the backup system are selected from full backups, cumulative incremental backups, differential incremental backups, and a combination thereof.

29. The method of claim 27 wherein the backup system employs removable storage units.

30. The method of claim 29 wherein the removable storage units are selected from tapes, disks, and optical disks.

31. The method of claim 27 wherein backup configuration parameters include the backup system maintaining a second subset of the retrieval points that are older than the first subset of the retrieval points.

32. The method of claim 26 wherein the second-level secondary storage location occasionally propagates a second-level retrieval point to a third-level secondary storage location.

33. The method of claim 32 wherein the third-level secondary storage location is a remote vault and the second-level retrieval point is stored within one or more removable storage units.

34. A computer-implemented method of estimating storage system availability comprising the steps of:

modeling a storage system design in operation under a workload by employing a hierarchical model to determine location of retrieval points, the hierarchical model having levels corresponding to each of a primary storage location and a plurality of secondary storage locations, the primary and secondary storage locations serving as sources for retrieval points of successively lower levels of the hierarchical model, and the retrieval points providing sources for primary storage recovery for a plurality of failure scenarios; and for a particular failure scenario:
receiving a target recovery time, which is a point-in-time to which restoration of data is desired;
finding a secondary storage location from among the plurality of secondary storage locations of a most recent retrieval point relative to the target recovery time that is available for recovery which includes considering the secondary storage nodes having successively older retention periods for the retrieval points until the most recent retrieval point is found; and
determining a recovery time for propagation of the most recent retrieval point from the identified secondary storage location to the primary storage location by determining a recovery path from the identified secondary storage location to the primary storage location and recursively computing a time at which each level in the recovery path is ready to serve as a source for the data.

35. A computer readable medium comprising computer code which when executed implements a method of estimating storage system availability, the method of estimating storage system availability comprising the steps of:

modeling a storage system design in operation under a workload by employing a hierarchical model to determine location of retrieval points, the hierarchical model having levels corresponding to each of a primary storage location and a plurality of secondary storage locations, the primary and secondary storage locations serving as sources for retrieval points of successively lower levels of the hierarchical model, and the retrieval points providing sources for primary storage recovery for a plurality of failure scenarios; and for a particular failure scenario:
receiving a target recovery time, which is a point-in-time to which restoration of data is desired;
finding a secondary storage location from among the plurality of secondary storage locations of a most recent retrieval point relative to the target recovery time that is available for recovery; and
determining a recovery time for propagation of the most recent retrieval point from the identified secondary storage location to the primary storage location by determining a recovery path from the identified secondary storage location to the primary storage location and recursively computing a time at which each level in the recovery path is ready to serve as a source for the data.

36. A computer readable medium comprising computer code which when executed implements a method of estimating storage system availability, the method of estimating storage system availability comprising the steps of:

modeling a storage system design in operation under a workload by employing a hierarchical model to determine location of retrieval points, the hierarchical model having levels corresponding to each of a primary storage location and a plurality of secondary storage locations, the primary and secondary storage locations serving as sources for retrieval points of successively lower levels of the hierarchical model, and the retrieval points providing sources for primary storage recovery for a plurality of failure scenarios; and for a particular failure scenario:
receiving a target recovery time, which is a point-in-time to which restoration of data is desired;
finding a secondary storage location from among the plurality of secondary storage locations of a most recent retrieval point relative to the target recovery time that is available for recovery which includes considering the secondary storage nodes having successively older retention periods for the retrieval points until the most recent retrieval point is found; and
determining a recovery time for propagation of the most recent retrieval point from the identified secondary storage location to the primary storage location by determining a recovery path from the identified secondary storage location to the primary storage location and recursively computing a time at which each level in the recovery path is ready to serve as a source for the data.

* * * * *

UNITED STATES PATENT AND TRADEMARK OFFICE
CERTIFICATE OF CORRECTION

PATENT NO. : 7,536,585 B1  Page 1 of 1
APPLICATION NO. : 11/166670
DATED : May 19, 2009
INVENTOR(S) : Kimberly Keeton et al.

It is certified that error appears in the above-identified patent and that said Letters Patent is hereby corrected as shown below:

In column 5, line 64, delete "secondary" and insert -- storage --, therefor.

In column 11, line 55, after "most" insert -- recent --.

In column 12, line 40, delete "secondary" and insert -- primary --, therefor.

In column 18, line 44, delete "%50,000" and insert -- $50,000 --, therefor.

In column 19, line 36, delete "data failure scenario," and insert -- data object failure, --, therefor.

Signed and Sealed this

Fourth Day of May, 2010

David J. Kappos
*Director of the United States Patent and Trademark Office*